United States Patent
Yoshioka et al.

(10) Patent No.: US 8,822,570 B2
(45) Date of Patent: Sep. 2, 2014

(54) PHOTOCURABLE COATING COMPOSITION AND COATING FILM FORMED BY HARDENING SAME

(75) Inventors: Masahito Yoshioka, Settsu (JP); Masahiro Miyamoto, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/504,526

(22) PCT Filed: Oct. 28, 2010

(86) PCT No.: PCT/JP2010/069196
§ 371 (c)(1), (2), (4) Date: Apr. 27, 2012

(87) PCT Pub. No.: WO2011/052690
PCT Pub. Date: May 5, 2011

(65) Prior Publication Data
US 2012/0208000 A1    Aug. 16, 2012

(51) Int. Cl.
  *C09D 4/06* (2006.01)
  *C09D 7/12* (2006.01)
  *C08F 285/00* (2006.01)
  *C09D 175/16* (2006.01)

(52) U.S. Cl.
  CPC *C09D 4/06* (2013.01); *C09D 7/125* (2013.01); *C09D 7/1266* (2013.01); *C08F 285/00* (2013.01); *C09D 7/1275* (2013.01); *C09D 175/16* (2013.01); *C09D 7/1291* (2013.01); *C08L 2207/53* (2013.01)
  USPC ............................... 523/201; 522/1; 524/523

(58) Field of Classification Search
  USPC ................... 522/1; 523/201; 524/523
  See application file for complete search history.

(56) References Cited

U.S. PATENT DOCUMENTS

| | | | |
|---|---|---|---|
| 3,218,305 A | 11/1965 | Krieble | |
| 4,536,546 A | 8/1985 | Briggs | |
| 4,937,173 A | 6/1990 | Kanda et al. | |
| 7,275,178 B2 | 9/2007 | Inoue et al. | |
| 2004/0077766 A1 | 4/2004 | De Cooman et al. | |
| 2005/0144500 A1 | 6/2005 | Inoue et al. | |
| 2006/0240198 A1 | 10/2006 | Tanikawa et al. | |
| 2008/0302479 A1 | 12/2008 | Barker et al. | |
| 2009/0093562 A1 | 4/2009 | Tanikawa et al. | |
| 2009/0134358 A1 | 5/2009 | Tanikawa et al. | |
| 2011/0269894 A1* | 11/2011 | Miyamoto | 524/532 |

FOREIGN PATENT DOCUMENTS

| | | |
|---|---|---|
| CA | 1192688 A1 | 8/1985 |
| JP | 61-162501 A | 7/1986 |
| JP | 62-43412 A | 2/1987 |
| JP | 04-275204 A | 9/1992 |
| JP | 05-306379 A | 11/1993 |
| JP | 10-237420 A | 9/1998 |
| JP | 2000-178398 A | 6/2000 |
| JP | 2001-81114 A | 3/2001 |
| JP | 2001-220525 A | 8/2001 |
| JP | 2001-247793 A | 9/2001 |
| JP | 2005-15757 A | 1/2005 |
| JP | 2006-089627 A | 4/2006 |
| JP | 2007002046 A * | 1/2007 |
| JP | 2007-238732 A | 9/2007 |
| JP | 2009-62400 A | 3/2009 |
| WO | 2007-068625 A1 | 6/2007 |
| WO | 2008/069656 A1 | 6/2008 |

OTHER PUBLICATIONS

Machine translation of JP 2001-220525, published Aug. 14, 2001.*
Machine translation of JP 2007-002046, published Jan. 11, 2007.*

* cited by examiner

*Primary Examiner* — Vickey Nerangis
(74) *Attorney, Agent, or Firm* — Westerman, Hattori, Daniels & Adrian LLP

(57) ABSTRACT

The photocurable coating composition according to the present invention is characterized in comprising 100 parts by mass of a vinyl monomer (A) and not less than 0.1 parts by mass and not more than 50 parts by mass of a minute polymer particle (B); wherein the volume average particle diameter of the minute polymer particle (B) is not less than 0.05 μm and not more than 1 μm; the vinyl monomer (A) contains one or more monomers selected from the group consisting of a (meth)acrylic acid ester monomer, hydroxyethyl (meth)acrylate and a urethane-modified (meth)acrylate as a main component; and the (meth)acrylic acid ester monomer is synthesized from an alcohol having not less than 3 carbon atoms and (meth)acrylic acid.

8 Claims, No Drawings

PHOTOCURABLE COATING COMPOSITION AND COATING FILM FORMED BY HARDENING SAME

TECHNICAL FIELD

The present invention relates to a photocurable coating composition improved with a minute polymer particle, and a coating film formed by hardening the photocurable coating composition.

BACKGROUND OF THE INVENTION

A photocurable coating composition has widely been used as an excellent coating material in various industrial fields, since the composition functions as a coating material which is quickly hardened by irradiation of an ultraviolet ray or the like, and an energy requirement necessary for forming a coating film is low.

For a coating material, physical properties and appearance of a coating film formed using the material are generally important. Also, for a photocurable coating composition, it is desired that a coating film formed using the composition has, for example, excellent elongation. It is also desired for a photocurable coating composition to be excellent in handling properties and curability.

In order to cope with such a requirement, Patent Document 1 discloses an invention for obtaining a coating film having improved elongation. In the invention, a compound having a specific structure typified by urethane acrylate is used as a constituent component of a photocurable coating composition. Specifically, the document discloses a photocurable resin composition containing (A) a urethane compound, (B) a photopolymerizable monomer having a reactive unsaturated group and (C) a photopolymerization initiator for a reaction, wherein the urethane compound is obtained by mixing (a) an isocyanate compound having two isocyanate groups in a molecule, (b) polyoxyalkylene glycol having a number average molecular weight of more than 1,000 and not more than 2,500, (c) an alkylene glycol or a polyoxyalkylene glycol having a number average molecular weight of not less than 62 and not more than 1,000, and (d) an ethylenical unsaturated compound having a hydroxyl group so that a ratio of the number of moles of the component (b) relative to the number of moles of the component (c) becomes not less than 1, and also an equivalent ratio of a hydroxy group of the components (b), (c) and (d) relative to an isocyanate group of the component (a) becomes 1.0 to 1.1.

Patent Document 2 discloses an invention in which a fine polymer particle having a core-shell structure is used as a constituent component of a photocurable coating composition. The fine polymer particle used herein, i.e. a core-shell type fine polymer particle, is a commercially available powdered core-shell type fine polymer particle. The document discloses preferable particle diameter of a core-shell type fine polymer particle, but neither discloses nor suggests a dispersion state and a dispersion particle diameter of a core-shell type fine polymer particle in a photocurable coating composition.

Specifically, in the invention described in Patent Document 1, it is intended to obtain a coating film having desired physical properties by using a copolymer of (B) a photopolymerizable monomer having a reactive unsaturated group and (A) an urethane compound as a polymer constituting the coating film. On the other hand, in the invention described in Patent Document 2, it is intended to obtain a coating film having desired physical properties by admixing a core-shell type fine polymer particle with a copolymer constituting the coating film without changing the structure of the copolymer.

PRIOR ART

Patent Document

Patent document 1: JP-A-2006-089627
Patent document 2: JP-A-2005-015757

SUMMARY OF THE INVENTION

Problem to be Solved by the Invention

From the viewpoint of chemical resistance, abrasion resistance and the like, a coating film having high cross-link density and excellent mechanical physical properties has high industrial value. In the invention disclosed in Patent Document 1, it is intended to obtain a coating film having desired mechanical physical properties by using a urethane compound as a copolymerization component of a photopolymerizable monomer having a reactive unsaturated group to adjust cross-link density and flexibility of a copolymer. However, it is not easy to improve mechanical properties of a coating film with maintaining the cross-link density of the copolymer, since the both have a contrary relation.

Even if a photocurable coating composition was prepared using a powdered core-shell type fine polymer particle in accordance with the invention of Patent Document 2, a core-shell type fine polymer particle essentially remained as an aggregation particle of several micrometers to dozens of micrometer or more in the composition. Such an aggregated particle has a fatal problem that when the particle has the size which is equal to or more than the thickness of a coating film, the particle appears on a surface of the coating film to impair appearance of the coating film. There was also a problem that it is difficult to sufficiently obtain the effect of improving mechanical physical properties of the coating film. It is estimated that the problem is caused by the following reason.

In general, a powdered core-shell type fine polymer particle is added to a thermoplastic resin as an impact resistance modifier, and is dispersed in a state of a primary particle in the thermoplastic resin by applying high shear at the time of molding, in order to improve the toughness effect. It is easy for a thermoplastic resin to be admixed with a core-shell type fine polymer particle at high temperature under high shear, and thus a powdered core-shell type fine polymer particle can be dispersed in a state of a primary particle. It is important that a core-shell fine polymer particle is dispersed in a state of a primary particle so that a core-shell type fine polymer particle exerts high toughness improving effect. It is also possible for a core-shell fine polymer particle dispersed in a state of a primary particle to improve mechanical properties of a thermoplastic resin by deformation of the core-shell fine polymer particle per se, induction of plastic deformation, which are also referred to as shear yielding or craze, of a polymer existing at the peripheries thereof, or the like.

In contrast, as the case described in Patent Document 2, when a powdered core-shell type fine polymer particle is admixed with a (meth)acrylic acid ester monomer, it is not easy to admix a core-shell type fine polymer particle at high temperature under high shear. Therefore, a core-shell type fine polymer particle is not dispersed in a state of a primary particle and thus remains a state of being aggregated in such a case. A core-shell type fine polymer particle can be seemingly in a state of being mixed. However, actually, a core-shell type fine polymer particle cannot be dispersed in a state of a primary particle, and is present in a (meth)acrylic acid ester monomer in a state of being aggregated.

As is apparent from such technological background, there has not hitherto been obtained a photocurable coating composition containing a fine polymer particle typified by a core-shell graft polymer, which can improve mechanical physical properties of a coating film.

Under such circumstances, the present invention was completed, and the objective suggested by the present inventors is to provide a photocurable coating composition that have been previously unavailable, which does not cause an appearance-related problem as described above and also can form a coating film having excellent properties, by using the minute polymer particle of the present invention.

Means to Solve the Problem

The present inventors seriously studied hard. As a result, the inventors found that an coating film having a superior appearance and mechanical physical properties, which cannot be obtained by conventional inventions, can be formed from the photocurable coating composition according to the present invention prepared from a minute polymer particle and a vinyl monomer.

The present inventors also found that when a urethane-modified (meth)acrylate is used as a vinyl monomer, a coating film having a similar appearance and superior mechanical physical properties can be obtained compared to conventionally known a photocurable coating compositions.

By the photocurable coating composition according to the present invention, the above-described problems can be solved. The photocurable coating composition according to the present invention is characterized in comprising 100 parts by mass of the vinyl monomer (A) and not less than 0.1 parts by mass and not more than 50 parts by mass of a minute polymer particle (B); wherein the volume average particle diameter of the minute polymer particle (B) is not less than 0.05 μm and not more than 1 μm; the vinyl monomer (A) contains one or more monomers selected from the group consisting of a (meth)acrylic acid ester monomer, hydroxyethyl (meth)acrylate and a urethane-modified (meth)acrylate as a main component; and the (meth)acrylic acid ester monomer is synthesized from an alcohol having not less than 3 carbon atoms and (meth)acrylic acid.

In the photocurable coating composition according to the present invention, it is preferred that 100 parts by mass of the vinyl monomer (A) consists of not less than 50 parts by mass and not more than 100 parts by mass of the (meth)acrylic acid ester monomer synthesized from the alcohol having not less than 3 carbon atoms and (meth)acrylic acid and/or hydroxyethyl (meth)acrylate, not less than 0 parts by mass and not more than 50 parts by mass of an aromatic vinyl monomer, and not less than 0 parts by mass and not more than 50 parts by mass of other vinyl monomer. Also, it is preferred that 100 parts by mass of the vinyl monomer (A) consists of not less than 1 parts by mass and not more than 100 parts by mass of the urethane-modified (meth)acrylate, and not less than 0 parts by mass and not more than 99 parts by mass of a vinyl monomer other than the urethane-modified (meth)acrylate. It is also preferred that the vinyl monomer other than the urethane-modified (meth)acrylate is one or more monomers selected from the group consisting of the (meth)acrylic acid ester monomer synthesized from the alcohol having not less than 3 carbon atoms and (meth)acrylic acid, hydroxyethyl (meth)acrylate and the aromatic vinyl monomer.

In the photocurable coating composition according to the present invention, it is preferred that the (meth)acrylic acid ester monomer synthesized from the alcohol having not less than 3 carbon atoms and (meth)acrylic acid is a cycloaliphatic alkyl (meth)acrylate, an alkyleneglycol di(meth)acrylate, a tri(meth)acrylate having a branched alkylene ether group or a poly(meth)acrylate having multiple branched alkyl groups; and that the urethane-modified (meth)acrylate has not less than 3(meth)acryloyloxy groups in the molecule.

In the photocurable coating composition according to the present invention, it is preferred that the minute polymer particle (B) is a core/shell graft copolymer having at least two layers of an elastic core layer present inside and a shell layer present outermost, and the elastic core layer consists of a rubber polymer having a glass-transition temperature of less than 0° C. It is also preferred that the minute polymer particle (B) is primarily dispersed in the vinyl monomer (A).

It is preferred that the shell layer in the minute polymer particle (B) consists of a copolymer of 100% by mass of monomers for forming the shell layer, and the monomers for forming the shell layer consists of not less than 2% by mass and not more than 90% by mass of one or more monomers (BS-1) selected from the group of consisting of an alkoxyalkyl (meth)acrylate, a hydroxyalkyl (meth)acrylate and glycidyl (meth)acrylate, not less than 2% by mass and not more than 98% by mass of one or more monomers (BS-2) selected from the group of consisting of an alkyl (meth)acylate, styrene, α-methylstyrene and (meth)acrylonitrile, not less than 0% by mass and not more than 10% by mass of a multifunctional vinyl monomer (BS-3), and not less than 0% by mass and not more than 10% by mass of other vinyl monomer (BS-4) copolymerizable with the said monomers.

The present invention also relates to a coating film which is obtained by hardening the above-described photocurable coating composition. For the coating film according to the present invention, it is preferred that a thickness of the coating film is not less than 1.5 times of the volume average particle diameter of the minute polymer particle (B) and not more than 100 μm.

In the present invention, the term "(meth)acrylic acid (ester)" means acrylic acid (ester) and/or methacrylic acid (ester).

Effect of the Invention

By the photocurable coating composition according to the present invention, a coating film which is excellent in appearance and mechanical properties can be provided. It has been difficult that such a coating film is prepared by conventional technologies. The photocurable coating composition is constructed by inclusion of a minute polymer particle, particularly a core-shell type minute polymer particle.

DETAILED DESCRIPTION OF THE INVENTION

A coating film which is excellent in appearance and mechanical properties can be obtained using the photocurable coating composition according to the present invention. The photocurable coating composition according to the present invention is characterized in comprising 100 parts by mass of a vinyl monomer (A) and not less than 0.1 parts by mass and not more than 50 parts by mass of a minute polymer particle (B); wherein the volume average particle diameter of the minute polymer particle (B) is not less than 0.05 μm and not more than 1 μm; the vinyl monomer (A) contains one or more monomers selected from the group consisting of a (meth) acrylic acid ester monomer, hydroxyethyl (meth)acrylate and a urethane-modified (meth)acrylate as a main component; and the (meth)acrylic acid ester monomer is synthesized from an alcohol having not less than 3 carbon atoms and (meth) acrylic acid. Hereinafter, the photocurable coating composition according to the present invention is described in detail.

Vinyl Monomer (A)

It is required for the vinyl monomer (A) to be used in the present invention to have the content of the above-described three monomers of not less than 50% by mass in total. In other words, it is required that the content of one kind of monomer selected from the above-described monomers or a mixture obtained by optionally using one or more above-described monomers in combination is not less than 50% by mass.

From the viewpoint of improving particularly photocurability of a composition and abrasion resistance of a coating film to be formed using the composition, 100 parts by mass of the vinyl monomer (A) is preferably composed of not less than 50 parts by mass and not more than 100 parts by mass of a (meth)acrylic acid ester monomer and/or hydroxyethyl (meth)acrylate, not less than 0 parts by mass and not more than 50 parts by mass of an aromatic vinyl monomer, and not less than 0 parts by mass and not more than 50 parts by mass of other vinyl monomer, wherein the (meth)acrylic acid ester monomer is synthesized from an alcohol having not less than 3 carbon atoms and (meth)acrylic acid. More preferably, 100 parts by mass of the vinyl monomer (A) is composed of not less than 50 by mass and not more than 99 parts by mass of a (meth)acrylic acid ester monomer and/or hydroxyethyl (meth)acrylate, not less than 0 parts by mass and not more than 50 parts by mass of an aromatic vinyl monomer, and not less than 1 parts by mass and not more than 50 parts by mass of other vinyl monomer.

Also, 100 parts by mass of the vinyl monomer (A) maybe composed of not less than 1 parts by mass and not more than 100 parts by mass of a urethane-modified (meth)acrylate, and not less than 0 parts by mass and not more than 99 parts by mass of vinyl monomer other than the urethane-modified (meth)acrylate. With such a constitution, it is possible to improve mechanical properties of a coating film made of a polymer of the urethane-modified (meth)acrylate or a copolymer of the urethane-modified (meth)acrylate and a vinyl monomer without impairing the appearance.

From the viewpoint of a balance between ease of handling of the coating composition according to the present invention and physical properties of the coating film, 100 parts by mass of the vinyl monomer (A) is preferably composed of not less than 1 parts by mass and not more than 90 parts by mass of a urethane-modified (meth)acrylate and not less than 10 parts by mass and not more than 99 parts by mass of vinyl monomer other than the urethane-modified (meth)acrylate; more preferably not less than 10 parts by mass and not more than 80 parts by mass of the former and not less than 20 parts by mass and not more than 90 parts by mass of the latter; still more preferably not less than 10 parts by mass and not more than 70 parts by mass of the former and not less than 30 parts by mass and not more than 90 parts by mass of the latter; and particularly preferably not less than 10 parts by mass and not more than 45 parts by mass of the former and not less than 55 parts by mass and not more than 90 parts by mass of the latter.

In the present invention, a vinyl monomer other than the urethane-modified (meth)acrylate is preferably one or more kinds selected from the group consisting of a (meth)acrylic acid ester monomer synthesized from an alcohol having not less than 3 carbon atoms and (meth)acrylic acid, hydroxyethyl (meth)acrylate, and an aromatic vinyl monomer.

(Meth)acrylic Acid Ester Monomer Synthesized from Alcohol having not less than 3 Carbon Atoms and (Meth)acrylic Acid The (meth)acrylic acid ester monomer synthesized from the alcohol having not less than 3 carbon atoms and (meth)acrylic acid is exemplified by a (meth)acrylate monomer (AA1) having one (meth)acryloyloxy group in the molecule, and a (meth)acrylate monomer (AA2) having not less than 2 (meth)acryloyloxy groups in the molecule. In particular, in case of obtaining a composition which is likely to be hardened in the presence of oxygen, such as in air atmosphere, it is preferred that the content of AA2 having high photocurability in air is more than that of AA1.

A (meth)acrylate monomer (AA1) having one (meth)acryloyloxy group in the molecule is exemplified by a chained alkyl (meth)acrylate, such as butyl (meth)acrylate, propyl (meth)acrylate, hexyl (meth)acrylate and isodecyl acrylate; a cycloaliphatic alkyl (meth)acrylate, such as cyclohexyl (meth)acrylate and isobornyl (meth)acrylate; a heterocyclic alkyl (meth)acrylate, such as tetrahydrofurfuryl (meth)acrylate; an alkoxyalkyl (meth)acrylate, such as 2-methoxyethyl (meth)acrylate, 2-ethoxyethyl (meth)acrylate, ethoxyethoxyethyl (meth)acrylate and 2-phenoxyethyl (meth)acrylate; a hydroxy group-containing (meth)acrylate, such as 2-hydroxyethyl methacrylate, 2-hydroxypropyl (meth)acrylate and 4-hydroxybutyl (meth)acrylate;

an epoxy group-containing (meth)acrylate, such as glycidyl (meth)acrylate; a (meth)acrylate having an ethylenical unsaturated double bond, such as allyl (meth)acrylate.

A (meth)acrylate monomer (AA2) having two (meth)acryloyloxy groups in the molecule among the (meth)acrylate monomer (AA2) having not less than 2 (meth)acryloyloxy groups in the molecule is exemplified by an alkyleneglycol di(meth)acrylate, such as ethyleneglycol di(meth)acrylate, butanediol di(meth)acrylate, hexanediol di(meth)acrylate and cyclohexanedimethanol di(meth)acrylate; and a polyalkyleneglycol di(meth)acrylate, such as triethyleneglycol di(meth)acrylate, tripropyleneglycol di(meth)acrylate, tetraethyleneglycol di(meth)acrylate and polyethyleneglycol (600) di(meth)acrylate.

A (meth)acrylate monomer (AA2) having three (meth)acryloyloxy groups in the molecule is exemplified by a tri(meth)acrylate having a branched alkyl group, such as trimethylolpropane tri(meth)acrylate and pentaerythritol tri(meth)acrylate; a tri(meth)acrylate having a branched alkylene ether group, such as glycerolpropoxy tri(meth)acrylate and trimethylolpropanetriethoxy tri(meth)acrylate; and a tri(meth)acrylate having a heterocyclic ring, such as tris(2-hydroxyethyl)isocyanurate tri(meth)acrylate. A (meth)acrylate monomer (AA2) having not less than 4 (meth)acryloyloxy groups in the molecule is exemplified by a poly(meth)acrylate having multiple branched alkyl groups, such as di(trimethylolpropane) tetra(meth)acrylate and dipentaerythritol hexa(meth)acrylate; and a poly(meth)acrylate having multiple branched alkyl groups and hydroxy groups, such as dipentaerythritol penta(meth)acrylate.

One of the above (meth)acrylic acid ester monomers maybe singly used, or multiple monomers may be used in combination.

In terms of industrial usage frequency, the above (meth)acrylic acid ester monomer is preferably a chained alkyl (meth)acrylate, a cycloaliphatic alkyl (meth)acrylate, an alkoxyalkyl (meth)acrylate, a hydroxy group-containing (meth)acrylate, an alkyleneglycol di(meth)acrylate, a polyalkyleneglycol di(meth)acrylate, a tri(meth)acrylate having a branched alkyl group a tri(meth)acrylate having a branched alkylene ether group, a poly(meth)acrylate having multiple branched alkyl groups, a poly(meth)acrylate having multiple branched alkyl groups and hydroxy groups. Specifically, the above (meth)acrylic acid ester monomer is more preferably isobornyl acrylate (IBOA), isodecyl acrylate, tetrahydrofurfuryl acrylate, phenoxyethyl acrylate, hydroxypropyl (meth)acrylate, hexanediol diacrylate (HDODA), triethyleneglycol di(meth)acrylate, tripropyleneglycol diacrylate (TRPGDA), tetraethyleneglycol di(meth)acrylate, trimethylolpropane triacrylate (TMPTA), trimethylolpropanetriethoxy triacrylate (which may be referred to as TMPTETA or EO3TMPTA in some cases), glycerolpropoxytriacrylate, pentaerythritol triacrylate (PETA), di(trimethylolpropane) tetraacrylate (DTMP4A), dipentaerythritol pentaacrylate, dipentaerythritol hexaacrylate (DPEHA). The above described specific (meth)acrylic acid ester monomer has not less than 1 and not more than 5 (meth)acryloyl groups in the molecule.

Urethane-Modified (Meth)acrylate

A urethane-modified (meth)acrylate has such properties that it is less likely to undergo inhibition of radical polymerization even under an oxygen atmosphere due to weak anaerobic properties. Therefore, the photocurable coating composition of the present invention is capable of making use of such properties by using a urethane-modified (meth)acrylate as the vinyl monomer (A) component.

The urethane-modified (meth)acrylate to be used in the present invention is preferably a urethane (meth)acrylate obtained by reacting (1) polyisocyanate with (2) a hydroxy group-containing (meth)acrylic acid ester, and optionally, (3) a compound having a hydroxy group in the molecule, such as a polyester having a hydroxy group, a polyether having a hydroxy group, an acrylic polyol and an polyvinyl alcohol.

As the said polyisocyanate, a compound having not less than 2 isocyanate groups in the molecule can be used. Such a polyisocyanate is exemplified by an aromatic polyisocyanate, such as tolylenediisocyanate, 4,4'-diphenylmethanediisocyanate and xylenediisocyanate; an aliphatic polyisocyanate, such as lysinediisocyanate methyl ester and 2,2,4-trimethylhexamethylenediisocyanate; a bivalent isocyanate, such as hexamethylenediisocyanate, isophoronediisocyanate, hydrogenated tolylenediisocyanate and a cycloaliphatic polyisocyanate (for example, hydrogenated 4,4'-diphenylmethanediisocyanate); and a dimer and a trimer thereof.

For example, the said hydroxy group-containing (meth)acrylic acid ester is synthesized from an polyalcohol and (meth)acrylic acid or methacrylic acid, and has not less than one hydroxy group in the molecule.

A polyalcohol is exemplified by a chained alkane diol, such as 1,3-butanediol, 1,4-butanediol, 1,6-hexanediol, ethyleneglycol and neopentyl glycol; a chained alkylene ether diol, such as triethyleneglycol, polyethyleneglycol and polypropyleneglycol; a triol such as trimethylolpropane, glycerin and pentaerythritol; four or more valent alcohol, such as dipentaerythritol. The said polyalcohol may be added with alkylene oxide or cyclic ester such as caprolactone.

A hydroxy group-containing (meth)acrylic acid ester is preferably exemplified by:

a chained hydroxy alkyl (meth)acrylate, such as 2-hydroxyethyl (meth)acrylate and 1-methyl-2-hydroxyethyl (meth)acrylate;

glycerin di(meth)acrylate, or the derivative thereof, such as a derivative added with an alkylene oxide (for example, glycerin di(meth)acrylate added with ethylene oxide and glycerin di(meth)acrylate added with propylene oxide) and a derivative added with a cyclic ester (for example, glycerin di(meth)acrylate added with ε-caprolactone);

trimethylolpropane di(meth)acrylate, or a derivative thereof, such as a derivative added with an alkylene oxide (for example, trimethylolpropane di(meth)acrylate added with ethylene oxide and trimethylolpropane di(meth)acrylate added with propylene oxide) and a derivative added with a cyclic ester (for example, trimethylolpropane di(meth)acrylate added with ε-caprolactone);

pentaerythritol di(meth)acrylate, or a derivative thereof, such as a derivative added with an alkylene oxide (for example, pentaerythritol di(meth)acrylate added with ethylene oxide and pentaerythritol di(meth)acrylate added with propylene oxide) and a derivative added with a cyclic ester (for example, pentaerythritol di(meth)acrylate added with ε-caprolactone);

pentaerythritol tri(meth)acrylate, or a derivative thereof, such as a derivative added with an alkylene oxide (for example, pentaerythritol tri(meth)acrylate added with ethylene oxide and pentaerythritol tri(meth)acrylate added with propylene oxide) and a derivative added with a cyclic ester (for example, pentaerythritol tri(meth)acrylate added with ε-caprolactone);

pentaerythritol monoethoxylate di(meth)acrylate, or a derivative thereof, such as a derivative added with an alkylene oxide (for example, pentaerythritol monoethoxylate di(meth)acrylate added with ethylene oxide and pentaerythritol monoethoxylate di(meth)acrylate added with propylene oxide) and a derivative added with a cyclic ester (for example, pentaerythritol monoethoxylate di(meth)acrylate added with ε-caprolactone);

dipentaerythritol penta(meth)acrylate, or a derivative thereof, such as a derivative added with an alkylene oxide (for example, dipentaerythritol penta(meth)acrylate added with ethylene oxide and dipentaerythritol penta(meth)acrylate added with propylene oxide) and a derivative added with a cyclic ester (for example, dipentaerythritol penta(meth)acrylate added with ε-caprolactone);

dipentaerythritol monolaurylate tetra(meth)acrylate, or a derivative thereof, such as a derivative added with an alkylene oxide (for example, dipentaerythritol monolaurylate tetra(meth)acrylate added with ethylene oxide and dipentaerythritol monolaurylate tetra(meth)acrylate added with propylene oxide) and a derivative added with a cyclic ester (for example, dipentaerythritol monolaurylate tetra(meth)acrylate added with ε-caprolactone);

a methacrylated dipentaerythritol acrylate, such as dipentaerythritol dimethacrylate triacrylate, dipentaerythritol monomethacrylate tetraacrylate and dipentaerythritol tetramethacrylate monoacrylate.

In the present invention, it is preferred to use a hydroxy group-containing (meth)acrylic acid ester having not less than 2 and not more than 5 (meth)acryloyloxy groups in the molecule. The number of (meth)acryloyloxy group is more preferably not less than 2 and not more than 3.

The said polyester having a hydroxy group is exemplified by an ester compound of not less than one kind of polyalcohol and not less than one kind of polybasic acid, and a polyalcohol added with a cyclic ester such as caprolactone. The said polyalcohol is exemplified ones described as useful for the said hydroxy group-containing (meth)acrylic acid ester. The polybasic acid is exemplified by succinic acid, adipic acid, azelaic acid, sebacic acid, isophthalic acid, terephthalic acid, phthalic anhydride, trimellitic acid and the like.

The said polyether having a hydroxy group is exemplified one or more kinds of alkylene oxides added with a polyalcohol, one or more kinds of alkylene oxides added with a cyclic ester, such as caprolactone, in addition to a polyalcohol, and a polymer obtained from an alkylene oxide by ring-opening polymerization. The said polyalcohol is exemplified by ones described as useful for the said hydroxy group-containing (meth)acrylic acid ester.

The said polyvinyl alcohol is exemplified by polyvinyl alcohol (PVA), ethylenic polyvinyl alcohol (EVOH), silanol-modified polyvinyl alcohol and the like.

The urethane-modified (meth)acrylate to be used in the present invention is preferably obtained by reacting the said (1) polyisocyanate with (2) a hydroxyl group-containing (meth)acrylic acid ester, and optionally (3) a compound having a hydroxy group in the molecule, such as a polyester having a hydroxy group, a polyether having a hydroxy group, an acrylic polyol and a polyvinyl alcohol, while an equivalent ratio (molar ratio) of an isocyanate (NCO) group/a hydroxy (OH) group is adjusted within a range not less than about 0.7 and not more than about 1.20, and preferably not less than 0.8 and not more than 1.05.

The number average molecular weight is preferably not less than 500 and not more than 20,000, more preferably not less than 600 and not more than 12,000, still more preferably not less than 600 and not more than 6,000, and particularly preferably not less than 600 and not more than 3,000.

It is preferred to use a urethane-modified (meth)acrylate having not less than 3 (meth)acryloyloxy groups in the molecule. The number of (meth)acryloyloxy group is more preferably not less than 3 and not more than 6. It is particularly preferred to use a urethane-modified (meth)acrylate having a number average molecular weight within a range of not less than 600 and not more than 3,000 and having not less than 3 (meth)acryloyloxy groups in the molecule, since a coating film having excellent hardness can be obtained.

In the present invention, a commercially available product can be used as the urethane-modified (meth)acrylate. Such a commercially available product is exemplified by CN series available from Sartomer Company, Inc., Ebecryl (registered trademark) series available from Cytec Industries Incorporated, Photomer (registered trademark) series available from Cognis Corporation, an aliphatic urethane acrylate and an aromatic urethane acrylate available from The Nippon Synthetic Chemical Industry Co., Ltd., U-PICA Company. Ltd., The Nippon Synthetic Chemical Industry Co., Ltd., Negami Chemical Industrial Co., Ltd. and the like.

The urethane-modified (meth)acrylate to be used in the present invention maybe used singly, or two or more kinds of the compounds may be used in combination.

Aromatic Vinyl Monomer

The aromatic vinyl monomer to be used in the present invention is exemplified by styrene; a $C_{1-12}$ alkyl group- or $C_{1-12}$ alkoxy group-containing styrene, such as α-methylstyrene and methoxystyrene; a halogenated styrene, such as chlorostyrene and bromostyrene; a polyfunctional aromatic vinyl monomer, such as divinylbenzene; a polycyclic aromatic vinyl monomer, such as phenylstyrene and vinylnaphthalene; and the like. Among the exemplified aromatic vinyl monomers, styrene is more preferably from the viewpoint of industrial usage frequency. The aromatic vinyl monomer maybe used singly, or two or more kinds of the monomers may be used in combination.

Other Vinyl Monomers

Other vinyl monomer to be used in the present invention is a vinyl monomer which does not belong to any of the group consisting of the (meth)acrylic acid ester monomer synthesized from the alcohol having not less than 3 carbon atoms and (meth)acrylic acid, hydroxyethyl (meth)acrylate, the urethane-modified (meth)acrylate and the aromatic vinyl, and which is other than the monomers. The other vinyl monomer is exemplified by a (meth)acrylic acid ester monomer synthesized from an alcohol having 1 or 2 carbon atoms and (meth)acrylic acid, a vinylcyan monomer, a (meth)acrylamide monomer, a N-vinylamide monomer, an allyl ester monomer and the like.

The said (meth)acrylic acid ester monomer synthesized from an alcohol having 1 or 2 carbon atoms and (meth)acrylic acid is exemplified by methyl (meth)acrylate and ethyl (meth)acrylate.

The said vinylcyan monomer is exemplified by (meth)acrylonitrile and the like. From an industrial point of view, acrylonitrile is preferable.

The said (meth)acrylamide monomer is exemplified by (meth)acrylamide, N,N-dimethyl (meth)acrylamide, N-isopropyl (meth)acrylamide and the like. The said N-vinylamide monomer is exemplified by N-vinyl pyrrolidone, N-vinyl caprolactam and the like. The said allyl ester monomer is exemplified by diallyl phthalate and the like.

The said other vinyl monomer maybe used singly, or two or more kinds of the monomers may be used in combination.

Vinyl Monomer other than Urethane-Modified (Meth)acrylate

When the urethane-modified (meth)acrylate is used as the vinyl monomer (A), it is possible to use any vinyl monomer as the vinyl monomers other than the urethane-modified (meth)acrylate as long as it does not impair photocurability of the photocurable coating composition according to the present invention and can serve as a copolymerization component of the urethane-modified (meth)acrylate. From the viewpoint of making primarily dispersibility of the minute polymer particles (B) more stable, the vinyl monomer is preferably one or more kinds selected from the group consisting of a (meth)acrylic acid ester monomer synthesized from an alcohol having not less than 3 carbon atoms and (meth)acrylic acid, hydroxyethyl (meth)acrylate and an aromatic vinyl monomer.

It is possible to use the examples described above as the (meth)acrylic acid ester monomer and the aromatic vinyl monomer.

Content of Minute Polymer Particle (B)

It is required for the photocurable coating composition of the present invention to contain the minute polymer particle (B) in the amount of not less than 0.1 parts by mass and not more than 50 parts by mass based on 100 parts by mass of the vinyl monomer (A). When the content of the minute polymer particle (B) is less than 0.1 parts by mass, the effects of the present invention may sometimes vary. When the content of the minute polymer particle (B) is more than 50 parts by mass, viscosity of the photocurable coating composition may possibly become too high, and thus a hindrance to handling may cause in some cases. The content of the minute polymer particle (B) is preferably not less than 1 parts by mass and not more than 45 parts by mass, and more preferably not less than 2 parts by mass and not more than 40 parts by mass.

Particle Diameter of Minute Polymer Particle (B)

The primary particle diameter of the minute polymer particle (B) to be used in the present invention is preferably within a range of not less than 0.05 µm and not more than 1 µm, and more preferably not less than 0.1 µm and not more than 0.5 µm, in terms of a volume average particle diameter. The volume average particle diameter of minute polymer particle can be measured using a particle size analyzer by dynamic light scattering, for example, Microtrac UPA150 (manufactured by Nikkiso Co., Ltd.) or the like.

Dispersibility of Minute Polymer Particle (B)

In the photocurable coating composition of the present invention, the minute polymer particle (B) is preferably primarily dispersed in a continuous layer made of the vinyl monomer (A). The term "primarily dispersion" means that a particle is dispersed in a state of primary particle. Specifically, a particle dispersion rate calculated by the below-described method preferably becomes not less than 90%, more preferably not less than 93%, and still more preferably not less than 95%. It is possible by using such a composition to obtain a hardened product in which the minute polymer particle (B) is dispersed in a state of primary particle. As a result, it is possible to obtain a coating film having excellent quality and sufficiently improved mechanical strength, such as excellent abrasion resistance, due to the minute polymer particle (B).

It has been very difficult for conventional technology to actually mix a minute polymer particle (core-shell type minute polymer particle) in a vinyl monomer thereby realizing a state of being stably dispersed in the form of primary particle, and to maintain such a state. On the other hand, in the photocurable coating composition of the present invention, the minute polymer particle (B) is dispersed in a state of primary particle in a continuous layer made of the vinyl monomer (A). Therefore, it is possible to obtain a coating film having improved properties typified by elongation, by using the photocurable coating composition as a raw material.

In the photocurable coating composition according to the present invention, each minute polymer particle (B) is dispersed in the vinyl monomer (A) in a state of primary particle. As a result, light transmittance (transparency) is not impaired and a light scattering effect is sufficiently exerted at each particle. The reason for the effect is considered as follows. It becomes possible for the minute particle (B) located at a light irradiation area (non-shielding area) to sufficiently exert the effect of scattering irradiated light since the minute polymer particle (B) is homogenously dispersed in a state of primary particle. Thus, an irradiated light can also reach at the portion (shielding area) where a light is not directly irradiated but which portion is proximal to the non-shielding area. Therefore, the photocurable coating composition of the present invention becomes a composition excellent in dark area curability as a result of an improvement of arrival of light to the site where an irradiated light does not reach (dark area) which is proximal to the site where an irradiated light for hardening directly reaches.

A difference in refractive index between the minute polymer particle (B) and a continuous phase (matrix phase) existing at the peripheries thereof in the photocurable coating composition and a hardened product (coating film) obtained using the composition according to the present invention is also considered as one of factors which determine the degree of scattering of irradiated light by the minute polymer particle (B). The difference in refractive index can be measured in accordance with JIS K7142 using sodium D lines (589 nm). The value of the difference is preferably within 0.035 in terms of an absolute value. The photocurable coating composition of the present invention can be a composition excellent in curability of the above-mentioned light shielding area (dark area), since scattering effect of irradiated light can be sufficiently exerted due to such a factor of the refractive index in addition to individual minute polymer particle (B) in a state of primarily dispersion.

It is more preferred that the minute polymer particle (B) is stably dispersed in a state of primary particle in the photocurable coating composition of the present invention. In the present invention, the phrase 'the minute polymer particle (B) is "stably dispersed"' means a state where the minute polymer particle (B) is constantly dispersed for a long period under usual conditions without being aggregated, separated or precipitated in the vinyl monomer (A). In the present invention, it is more preferred that a dispersion state of the minute polymer particle (B) in the vinyl monomer (A) does not substantially change, and also the minute polymer particle can maintain "stable dispersion" even in a case of stirring after decreasing the viscosity by heating the composition of the present invention within a range where there is no risk.

In the present invention, it can be confirmed by measuring the dispersion particle diameter of the minute polymer particle (B) that the particle (B) is dispersed in a continuous layer of the vinyl monomer (A) in a state of primary particle. For example, there is exemplified a method in which the particle diameter of the minute polymer particle (B) in the composition of the present invention is measured using a particle size analyzer which makes use of light scattering. Alternatively, after the composition of the present invention or a compound containing the composition is hardened by an appropriate method, the obtained hardened product is observed by an optical technique including transmission electron microscope images or the like. If dispersion in a state of primary particle is confirmed by the observation, it is possible to judge that the minute polymer particle (B) is dispersed in primary particle before hardening.

Structure of Minute Polymer Particle (B)

The minute polymer particle (B) is preferably a core/shell graft copolymer (core-shell type minute polymer particle) having at least two layers of an elastic core layer present inside and a shell layer present outermost, and the elastic core layer consists of a rubber polymer having a glass-transition temperature of less than 0° C. More preferably, the minute polymer particle (B) according to the present invention is a minute polymer particle in which a shell layer is formed by graft-polymerizing a graft-copolymerizable monomer component in the presence of an elastic core layer made of such a rubbery polymer. In such a case, a minute polymer particle has a structure including an elastic core layer existing inside thereof, and at least one shell layer which is graft-polymerized on the surface thereof and covers the peripheries or a portion of the elastic core layer.

The amount of the shell layer of the minute polymer particle (B) to be used in the present invention may be at least the amount required to meet requirements of the present invention, and is preferably within a range of not less than 30/70 and not more than 99/1, more preferably not less than 50/50 and not more than 90/10, and still more preferably not less than 55/45 and not more than 88/12, in terms of a ratio of elastic core layer/shell layer, which represents mass ratio of a monomer constituting each polymer. When the ratio of elastic core layer/shell layer is less than 30/70 and the ratio of the elastic core layer decreases, the viscosity of the composition according to the present invention may possibly increase, and thus the obtained composition may be difficult to be handled in some cases. When the ratio of elastic core layer/shell layer is more than 99/1 and the ratio of the shell layer decreases, the minute polymer particle (B) maybe likely to be aggregated at the time of handling and an operability-related problem may possibly arise in some cases. There is also a possibility that physical properties to be expected to a hardened product obtained from the composition of the present invention may not be obtained.

When the minute polymer particle (B) includes at least two layers of an elastic core layer and a shell layer, and also the curability at dark area is particularly required in the composition of the present invention, it is preferred that a refractive index of the elastic core layer is different from that of the shell layer.

Specifically, when a refractive index is measured in accordance with JIS K7142 using sodium D lines (589 nm), an absolute value of the difference in refractive index between an elastic core layer and a shell layer is preferably more than 0 and not more than 0.045. It is more preferred that the refractive index of the entire minute polymer particle (B) including an elastic core layer and a shell layer is more preferably close to a refractive index of a continuous phase (which is also referred to as matrix phase or sea phase) existing at the peripheries of the minute polymer particle (B), specifically a difference in refractive index is within 0.035 in terms of an absolute value, and also the refractive index of an elastic core layer and/or a shell layer is different from the viewpoint of obtaining dark area curability and maintaining transparency of the composition of the present invention. In the present invention, the refractive index of the core layer means a refractive index of a (co)polymer obtained by polymerizing only a monomer constituting the core layer. Similarly, the refractive index of the shell layer means a refractive index of a (co)polymer obtained by polymerizing only a monomer constituting the shell layer.

Elastic Core Layer

The elastic core layer constituting the minute polymer particle (B) is made of a rubbery polymer having properties as a rubber capable of imparting toughness of a coating film (hardened product) according to the present invention. The elastic core layer often has a single-layered structure, and may have a multi-layered structure. When the elastic core layer has a multi-layered structure, each layer may have a different polymer composition.

Such a rubbery polymer preferably has a cross-linked structure. It is hard to dissolve the minute polymer particle (B) obtained using a rubbery polymer having a cross-linked structure as an elastic core layer in the vinyl monomer (A) component, even if the minute polymer particle swells therein. It is also hard to dissolve the minute polymer particle (B) even if the minute polymer particle swells in a solvent as a good solvent thereof. Therefore, it is possible to prevent the minute polymer particle (B) from losing the form thereof in the continuous layer.

The glass transition temperature (Tg) of the rubbery polymer is preferably lower than 0° C. From the viewpoint of enhancing the toughness imparting effect, the Tg is more preferably not more than −20° C., and more preferably not more than −45° C. There is no particular limitation on the lower limit of the glass transition temperature (Tg), but the lower limit is preferably −200° C., and more preferably −100° C.

The elastic core layer usually has a spherical shape, and there is no particular limitation on the volume average particle diameter of the core moiety as the elastic core layer in the minute polymer particle (B), as long as the volume average particle diameter of the minute polymer particle (B) is within a range of not less than 0.05 μm and not more than 1 μm. The volume average particle diameter is preferably not less than 0.05 μm and not more than 1 μm, and more preferably not less than 0.05 μm and not more than 0.6 μm. Since the elastic core layer is usually designed so as to become insoluble in the vinyl monomer (A), the core moiety particle diameter can be easily confirmed, for example, by observing the hardened product of the composition according to the present invention using a transmission electron microscope (TEM).

The rubbery polymer can be obtained by polymerizing a monomer for formation of a rubbery polymer. The polymer can be obtained by polymerizing a main monomer among the monomers for formation of a rubbery polymer, that is, a monomer serving as a first monomer, with other monomers. Such a rubbery polymer is exemplified by a diene rubber, an acrylic rubber, a polysiloxane rubber and the like. The diene rubber is obtained by polymerizing mainly a conjugated diene monomer as other monomer. The acrylic rubber is obtained by polymerizing mainly a (meth)acrylic acid ester monomer. The multiple said rubbers may be used in combination or as a complex as the rubbery polymer. From the viewpoint of costs, a diene rubber or an acrylic rubber is preferably used as the rubbery polymer. The monomer for formation of a rubbery polymer may further contain an aromatic vinyl monomer and a vinylcyan monomer in addition to the first monomer.

When an acrylic rubber is used as the rubbery polymer, the first monomer is preferably butyl acrylate, 2-ethylhexyl acrylate or the like. When a diene rubber is used as the rubbery polymer, the first monomer is preferably butadiene, isoprene or the like.

Cross-linking of Elastic Core Layer

The elastic core layer is preferably formed by introducing a cross-linked structure into a polymer component obtained by polymerizing the monomer. There is no particular limitation on the method of introducing a cross-linked structure, and a commonly used method can be employed. For example, the below-mentioned cross-linkable monomer such as a polyfunctional monomer is added to a polymerization component, and then the obtained mixture is polymerized. The gel content of the elastic core layer is preferably not less than 60% by mass, more preferably not less than 80% by mass, still more preferably not less than 90% by mass, and particularly preferably not less than 95% by mass. In the present invention, the term "gel content" means a ratio of an insoluble substance based on the total amount of an insoluble substance and a soluble substance when about 1.2 g of clam obtained by solidification and drying is immersed in 100 g of toluene, left to stand at 23° C. for 24 hours and then separated into an insoluble substance and a soluble substance.

Poylfunctional Monomer

The said polyfunctional monomer is not butadiene, and is exemplified by an alkyl (meth)acrylate having an allyl group, such as allyl (meth)acrylate and allyloxyalkyl (meth)acrylate; a polyfunctional (meth)acrylate, such as butanediol di(meth)acrylate, ethyleneglycol di(meth)acrylate, triethyleneglycol di(meth)acrylate and tetraethyleneglycol di(meth)acrylate; diallyl phthalate; triallylcyanurate, triallylisocyanurate, divinylbenzene, and the like. The said polyfunctional monomer is particularly preferably allyl methacrylate, triallylisocyanurate, butanediol di(meth)acrylate and divinylbenzene.

Shell Layer

The shell layer constituting the minute polymer particle (B) to be used in the present invention is preferably made of a shell polymer which plays a role of improving compatibility between the minute polymer particle (B) and the vinyl monomer (A), thereby enabling the minute polymer particle (B) to disperse in a state of primary particle in the curable composition according to the present invention, and the coating film (hardened product) thereof.

Such a shell polymer is preferably grafted with the elastic core layer. More precisely, it is preferred that a monomer component to be used to form the shell layer is graft-polymerized with a rubbery polymer constituting an elastic core layer, and thus the shell layer and the elastic core layer are chemically bonded substantially. In other words, the shell layer is formed by graft-polymerizing a monomer for formation of a shell layer (mixture) as a constituent component of a shell polymer in the presence of a rubbery polymer, and covers a portion or all of the rubbery polymer. Such a polymerization operation is carried out by adding a monomer for formation of a shell layer as a constituent component of a shell polymer to an existing latex of a rubbery polymer prepared in a state of an aqueous polymer latex, and polymerizing the obtained mixture. There is no particular limitation on Tg of a (co)polymer constituting a shell layer, and Tg is preferably not less than −50° C. and not more than 100° C., and more preferably less than 0° C.

Such a shell polymer can be obtained by polymerizing a monomer for formation of a shell layer (BS). From the viewpoint of effectively ensuring primarily dispersibility of the minute polymer particle (B), the shell polymer is preferably a copolymer of 100% by mass of a monomer for formation of a shell layer (BS) composed of not less than 2% by mass and not more than 90% by mass of one or more kinds of monomers (BS-1) selected from the group consisting of alkoxyalkyl (meth)acrylate, hydroxyalkyl (meth)acrylate and glycidyl (meth)acrylate; not less than 2% by mass and not more than 98% by mass of one or more kinds of monomer (BS-2) selected from the group consisting of alkyl (meth)acrylate, styrene, α-methylstyrene and (meth)acrylonitrile; not less than 0% by mass and not more than 10% by mass of a polyfunctional vinyl monomer (BS-3); not less than 0% by mass and not more than 10% by mass of other vinyl monomer (BS-4) which is copolymerizable with the said monomers.

The combination of such a monomer for formation of a shell layer (BS) is preferably exemplified by (1) a combination of an alkoxyalkyl (meth)acrylate containing an alkoxyalkyl group having not less than 2 and not more than 10 carbon atoms (more preferably not less than 2 and not more than 6 carbon atoms) and also having one ether bond by an oxygen atom as a monomer (BS-1), and an alkyl (meth)acrylate containing an alkyl group having not less than 2 and not more than 10 carbon atoms (more preferably not less than 2 and not more than 6 carbon atoms) as a monomer (BS-2); (2) a combination of a hydroxyalkyl (meth)acrylate containing a hydroxyalkyl group having not less than 2 and not more than 10 carbon atoms (more preferably not less than 2 and not more than 6 carbon atoms) and also having one hydroxy group as a monomer (BS-1), and an alkyl (meth)acrylate containing an alkyl group having not less than 2 and not more than 10 carbon atoms (more preferably not less than 2 and not more than 6 carbon atoms) as a monomer (BS-2); (3) a combination of an alkoxyalkyl (meth)acrylate containing an alkoxyalkyl group having not less than 2 and not more than 10 carbon atoms (more preferably not less than 2 and not more than 6 carbon atoms) and also having one ether bond due to an oxygen atom as a monomer (BS-1), and (meth)acrylonitrile as a monomer (BS-2); and the like. It is necessary that the minute polymer particle (B) is dispersed in the vinyl monomer (A) in a state of primary particle, and it is also necessary to prepare the minute polymer particle (B) in a state of an aqueous polymer latex without any industrial difficulty. In other words, it is necessary to obtain the minute polymer particle (B) as an aqueous polymer latex which is stable to a mechanical shear force such as stirring or solution sending by a pump. Therefore, it is preferred that styrene is contained as an essential component as a monomer (BS-2) in a monomer for formation of a shell layer (BS).

The proportions of a monomer (BS-1), a monomer (BS-2), a polyfunctional vinyl monomer (BS-3), and other vinyl monomer (BS-4) which is copolymerizable with the said monomers in the monomer for formation of a shell layer (BS) are preferably within the above-described ranges from the viewpoint of obtaining a more stable composition. From the viewpoint of sufficiently preventing the above-described swelling by introducing a cross-linked structure into a shell layer, it is more preferred that the monomer for formation of a shell layer (BS) composes of a polyfunctional vinyl monomer (BS-3) as an essential component, specifically within the range of not less than 0.1% by mass and not more than 5% by mass.

The said alkoxyalkyl (meth)acrylate in the above-described monomer (BS-1) is preferably exemplified by 2-methoxyethyl (meth)acrylate, 4-methoxybutyl (meth)acrylate, 2-ethoxyethyl (meth)acrylate, tetrahydrofurfuryl (meth)acrylate and 2-phenoxyethyl (meth)acrylate.

The said hydroxyalkyl (meth)acrylate in the above-described monomer (BS-1) is preferably exemplified by 2-hydroxypropyl (meth)acrylate and 4-hydroxybutyl (meth)acrylate.

The said alkyl (meth)acrylate in the above-described monomer (BS-2) is preferably exemplified by ethyl (meth)acrylate, butyl (meth)acrylate, tert-butyl (meth)acrylate, cyclohexyl (meth)acrylate and the like.

The said polyfunctional vinyl monomer (BS-3) is preferably exemplified by allyl (meth)acrylate, 1,3-butanediol di(meth)acrylate, diallyl phthalate, (poly)ethyleneglycol di(meth)acrylate, trimethylolpropane (tri)acrylate, triallylisocyanurate, tris(2-hydroxyethyl)isocyanurate triacrylate and the like.

The said other vinyl monomer (BS-4) is exemplified by a (meth) acrylamide monomer, an allyl ester monomer, a N-vinylpyrrolidone monomer and the like. The (meth)acrylamide monomer is exemplified by (meth)acrylamide, N,N-dimethyl (meth)acrylamide and N-isopropyl(meth)acrylamide. The allyl ester monomer is exemplified by diallyl phthalate. The N-vinylpyrrolidone monomer is exemplified by N-vinylpyrrolidone, N-vinylcaprolactam and the like.

The said monomers for forming of shell layer (BS-1) to (BS-4) may be used singly, or two or more kinds of the monomers may be used in combination.

Method for Production of Minute Polymer Particle (B)

The minute polymer particle (core-shell graft copolymer) to be used in the present invention can be produced by a well-known method such as emulsion polymerization, suspension polymerization and microsuspension polymerization method, using the said monomer for forming a rubbery polymer and the said monomer for forming a shell layer. Among the exemplified methods, an emulsion polymerization method, particularly a multistage emulsion polymerization method, is preferable from the viewpoint of controlling the structure of the minute polymer particle.

An emulsifier, i.e. dispersing agent, to be used in the emulsion polymerization method is exemplified by an anionic emulsifier (dispersing agent), such as an alkyl- or arylsulfonic acid typified by dioctylsulfosuccinic acid and dodecylbenzenesulfonic acid, an alkyl- or arylethersulfonic acid, an alkyl- or arylsulfuric acid typified by dodecylsulfuric acid, an alkyl- or arylethersulfuric acid, an alkyl- or aryl-substituted phosphoric acid, an alkyl- or arylether-substituted phosphoric acid, a N-alkyl- or arylsarcosinic acid typified by dodecylsarcosinic acid, an alkyl- or arylcarboxylic acid typified by oleic acid and stearic acid, various acids such as an alkyl- or arylethercarboxylic acid, and an alkali metal salt or an ammonium salt of the said acids; a nonionic emulsifier (dispersing agent), such as alkyl- or aryl-substituted polyethylene glycol; and a dispersing agent such as polyvinyl alcohol, alkyl-substituted cellulose, polyvinylpyrrolidone and polyacrylic acid derivative. The emulsifier (dispersing agent) may be used singly, or two or more kinds of the emulsifiers may be used in combination.

It is preferred that a small amount of the emulsifier (dispersing agent) is used as long as it does not cause a hindrance to dispersion stability of an aqueous latex of the minute polymer particle. The higher water solubility of the emulsifier (dispersing agent) is preferable. When water solubility is high, it becomes easy to remove the emulsifier (dispersing agent) by washing with water, and thus an adverse influence on the finally obtained minute polymer particle (B) can be easily prevented.

Method for Production of Photocurable Coating Composition of the Present Invention The photocurable coating composition of the present invention, more specifically a composition in which the minute polymer particle (B) is primarily dispersed in the vinyl monomer (A), can be produced by the method containing the steps of:

(the first step) mixing an aqueous latex containing the minute polymer particle (B) (specifically, a reaction mixture after producing the minute polymer particle (B) by emulsion polymerization) with an organic solvent having a solubility in water at 20° C. in a range of not less than 5% by mass and not more than 40% by mass, and then mixing the mixture with excess water thereby aggregating the minute polymer particle (B);

(the second step) separating and recovering the aggregated minute polymer particle (B) from a liquid phase, and then mixing the particle with an organic solvent again to obtain an organic solvent solution of the minute polymer particle (B);

(the third step) further mixing the organic solvent solution with the vinyl monomer (A) and then distilling off the organic solvent.

The organic solvent having solubility in water at 20° C. in a range of not less than 5% by mass and not more than 40% by mass is exemplified by a ketone such as methyl ethyl ketone; an ester such as methyl formate, methyl acetate and ethyl acetate; an ether such as diethylether, ethylene glycol diethyl ether and tetrahydropyran; an acetal such as methylal; and an alcohol such as isobutyl alcohol and sec-butyl alcohol. The organic solvent may be used singly, or two or more kinds of the solvents may be used in combination.

The above-described photocurable coating composition of the present invention, containing the vinyl monomer (A) and the minute polymer particle (B), may be used in combination with the other photocurable coating composition of the present invention. In such a case, the minute polymer particle (B) can be primarily dispersed in not only a continuous layer but also a hardened product.

Photopolymerization Initiator

The curable coating composition of the present invention preferably contains a photopolymerization initiator in the amount of not less than 0 parts by mass and not more than 12 parts by mass based on 100 parts by mass of the vinyl monomer (A). As long as the composition of the present invention has satisfactory light transmittance and causes neither shielding of an ultraviolet ray and a visible ray nor scattering, the content of the photopolymerization initiator is more preferably not less than 0.3 parts by mass and not more than 8 parts by mass. The photopolymerization initiator is a compound which can generate a radical by irradiation with an active ray such as an ultraviolet ray, a visible ray and an electron beam, and is also referred to as a photoradical initiator. When a free radical is generated by the radical polymerization initiator, a polymerization reaction (including a crosslinking reaction) of a carbon-carbon unsaturated double bond in the composition of the present invention arises, and the composition functions as a coating film by hardening. In case of hardening the composition of the present invention by an electron beam (EB), the composition of the present invention can be hardened without using a photopolymerization initiator.

There is no particular limitation on the photopolymerization initiator to be used in the present invention as long as it enables the vinyl monomer (A) to undergo a radical polymerization by irradiation with an ultraviolet ray, an electron beam and a visible ray.

The said photopolymerization initiator is exemplified by a benzophenone such as benzophenone and 4,4-bis(N,N'-dimethylamino)benzophenone; a benzoin such as benzoin, a benzoinalkylether wherein the alkyl is methyl, ethyl or isopropyl; an acetophenone such as 2,2-dimethoxyacetophenone and 1,1-dichloroacetophenone; a benzylketal such as benzylmethylketal (Irgacure 651 manufactured by Ciba Specialty Chemicals); an anthraquinone such as 2-methylanthraquinone, 1-chloroanthraquinone and 2-amylanthraquinone; a bisacylphosphine oxide such as phenyldi(2,4,6-trimethylbenzoyl)phosphine oxide (Irgacure 819 manufactured by Ciba Specialty Chemicals); a benzoylphosphine oxide such as 2,4,6-trimethylbenzoyl-diphenylphosphine oxide; triphenylphosphine; a α-hydroxyphenylketone such as 1-hydroxycyclohexylphenylketone (for example, Irgacure 184 manufactured by Ciba Specialty Chemicals), 2-hydroxyisopropylphenylketone and 2-hydroxy-1-[4-(2-hydroxyethoxy)phenyl]-1-propanone; a thioxanthone such as thioxanthone and 2-chlorothioxanthone; camphorquinone; and the like. In addition, an acridine derivative, a phenazine derivative, a quinoxaline derivative and the like can be also used. The said photopolymerization initiator may be used singly, or two or more kinds of the photopolymerization initiators may be used in combination.

Photosensitizer

It is preferred that the photocurable coating composition of the present invention optionally contains a photosensitizer together with such a photopolymerization initiator.

A photosensitizer is not activated alone by irradiation with an ultraviolet ray or the like. However, a photosensitizer has such a function that in case of being used in combination with a photopolymerization initiator, anaerobic properties becomes weak as compared with a photopolymerization initiator alone, and thus the progress of a radical polymerization under an air atmosphere is facilitated.

Such a photosensitizer is exemplified by an amine such as n-butylamine, triethylamine, N-methyldiethanolamine, piperidine, N,N-dimethylaniline, triethylenetetramine and diethylaminoethyl (meth)acrylate; a urea compound such as O-tolylthiourea; a sulfur compound such as s-benzyl-isothiuronium-p-toluenesulfonate; a nitrile such as N,N-dimethyl-p-aminobenzonitrile; a phosphorus compound such as sodium diethylthiophosphate; and the like. The photosensitizer may be used singly, or two or more kinds of the photosensitizers may be used in combination.

The content of the photosensitizer is preferably not less than 0 parts by mass and not more than 6 parts by mass based on 100 parts by mass of the photocurable coating composition of the present invention.

Hardening

An electron beam and a light in a range of an ultraviolet to a visible ray can be employed for hardening of the coating composition of the present invention. A light in a range of an ultraviolet to a visible ray range is exemplified by a high-pressure mercury lamp, a metal halide lamp, a laser light, a LED light, sunlight and the like. Typically, hardening can be performed by irradiation with a light in an integrated light quantity of not less than 1 mJ/cm$^2$ and not more than 9,000 mJ/cm$^2$. The composition can be hardened even under an air atmosphere, an inert gas atmosphere or an atmosphere of a mixed gas thereof, and hardening under an atmosphere with less oxygen concentration may give a coating film having excellent quality due to promotion of formation of a cross-linked structure and less hardening inhibition.

In case of hardening with a photoelectron beam (EB), a photopolymerization initiator is not necessarily required. For example, there can be exemplified a hardening method using an electron beam generator with an acceleration voltage of not less than 100 kV and not more than 500 kV. The composition can be hardened even under an air atmosphere, an inert gas atmosphere or an atmosphere of a mixed gas thereof. The lower the oxygen concentration is preferably, since ozone and nitrogen oxide may be generated by an electron beam, and lower oxygen concentration may cause less polymerization inhibition.

The thickness of the coating film obtained by hardening the coating composition of the present invention is preferably not less than 1.5 times the volume average particle diameter of the minute polymer particle (B) and not more than 100 μm. With such a constitution, a coating film having not only excellent mechanical strength but also excellent appearance can be obtained.

Others

There is no particular limitation on the coating method of the photocurable coating composition according to the present invention, and it is possible to use various methods such as a bar coating method, a microbar coating method, a spraying method, a dipping (soaking) method, a roll coating method, a roll knife coating method, a spin coating method, a slide coating method, a curtain coating method, a meniscus coating method, a bead coating method, a gravure coating method, a die coating method, a rod coating method, a screen printing method, a flexo printing method, a offset printing method, a gravure printing method and the like.

The composition of the present invention can also be appropriately diluted with an organic solvent to be used. There is no particular limitation on such an organic solvent as long as it is a solvent which is mixable with the vinyl monomer (A) and does not drastically impair handling properties of the coating composition of the present invention. It is preferred to use an organic solvent as long as it is mixable with the vinyl monomer (A), and also the minute polymer particle (B) is not separated from the coating composition of the present invention, and precipitation or lifting does not occur. It is more preferred to use an organic solvent as long as it is mixable with the vinyl monomer (A), and also a state where the minute polymer particle (B) is primarily dispersed is not impaired. There is no particular limitation on the use amount of the organic solvent, as long as it satisfies the above-described requirements. Such an organic solvent is specifically exemplified by an ester such as methyl formate, methyl acetate, ethyl acetate, butyl acetate and ethylene glycol monomethyl ether acetate; an alcohol such as ethanol, isopropyl alcohol, butanol, methyl glycol, ethyl cellosolve, methyl cellosolve and butyl cellosolve; a ketone such as methyl ethyl ketone, methyl isobutyl ketone, cyclohexanone, diacetone alcohol and acetone; an amide such as N-methylpyrrolidone and N,N-dimethylformamide; an ether such as tetrahydrofuran, dioxane and dioxolane; a halogenated hydrocarbon such as methylene chloride and dichloroethane; dimethyl sulfoxide; propylene carbonate; and the like. The organic solvent may be used singly, or two or more kinds of the solvents may be used in combination.

The photocurable coating composition of the present invention can be used by applying to various base materials. Such a base material is exemplified by a resin material such as polyester, polycarbonate, acrylic polymer, cycloolefin polymer and cellulose acylate; various thermocurable resins; woods; metals and the like.

EXAMPLES

The present invention is described in more detail with Examples and Comparative Examples, but the present invention is not limited thereto.

Method for Evaluation (1) Volume Average Particle Diameter

The volume average particle diameter of the minute polymer particle (B) was measured using a particle size analyzer (Microtrac (registered trademark) UPA, manufactured by Nikkiso Co., Ltd.).

(2) Flex Resistance Test by Conical Mandrel Method

Using BYK-Gardner Conical Mandrel (manufactured by BYK-Gardner USA) implemented in relation to the conical mandrel described in ASTM D522, the coating films produced in Examples and Comparative Examples were bent at 140 degrees along the conical mandrel. The coating films were bent facing outside (which side was not in contact with a mandrel). A surface of each coating film after bending was observed. The distance of the position where cracking stopped on the surface of the coating film from a tip of the conical mandrel, that is, the position where cracking was most likely to occur, was measured to obtain evaluation results. The measurement was carried out in accordance with ASTM D522 within a range from 0 to 8 inch. The test was carried out at room temperature and each test was carried out using four coating films. The distance where cracking did not occur at a discrete distance of ¼ inch unit was measured in three or more samples, to obtain evaluation results. The smaller the value is, the better the flex resistance is.

(3) Flex Resistance Test by Parallel Mandrel Method

Using the respective round bars, each having a diameter (φ) of 34 mm, 25 mm, 21 mm or 16 mm, coating films produced in Examples and Comparative Examples were bent at 140 degrees along the round bar, and then a surface of each coating film was observed whether cracking occurred or not. The coating film was bent facing outside (which side was not in contact with a round bar). The test was carried out at room temperature.

(4) Pencil Hardness

In accordance with JIS K5600, pencil hardness was evaluated at 23° C. under a load of 500 g. The evaluation results show that the surface becomes harder and is less likely to be scratched in the order of 2B, B, HB, F, H and 2H.

(5) Observation of Dispersion State and Particle Dispersion Rate

Using a transmission electron microscope, a dispersion state of the minute polymer particle (B) contained in the coating films obtained in Examples of the present invention and Comparative Examples was observed.

Each ultrathin section stained with osmium tetraoxide or ruthenium tetraoxide was made from the coating films obtained in Examples and Comparative Examples, and then observed by a transmission electron microscope and photographs were taken at least two position of an area in a range of 16 μm×22 μm. In the obtained TEM photograph, four areas, each having 5 cm square which corresponded to area of 5 μm square, were selected at random, and then total number B0 of the minute polymer particles (B), and total number B1 of the minute polymer particles (B) contained in the aggregate formed from three or more the minute polymer particles (B) were determined. In addition, a particle dispersion rate was calculated by the following equation 1.

Particle dispersion rate (%)=(1−(B1/B0))×100     (Equation 1)

Preparation of Aqueous Latex Containing an Acrylate Minute Polymer Particle (B1)

Under a nitrogen atmosphere, water (650 g), sodium dodecylbenzenesulfonate (0.2 g), tripotassium phosphate (0.12 g), iron (II) sulfate hexahydrate (5 mg), EDTA (ethylenediaminetetraacetic acid) (20 mg) and sodium formaldehydesulfoxylate (0.6 g) were added into a 2 L glass reaction vessel. The mixture was heated up to 40° C., and then a mixture of butyl acrylate (BA) (332 g), allyl methacrylate (AlMA) (8 g) and cumen hydroperoxide (0.23 g) was added thereto over 200 minutes. The mixture was continuously stirred for 90 minutes. During stirring, sodium dodecylbenzenesulfonate (2 g in total) was dividedly added twice thereto. Thus, an aqueous latex of a rubbery copolymer (340 g) as a polymer of a monomer mixture containing butyl acrylate as a main component was obtained.

Next, a mixture of a monomer mixture (171.4 g) of 2-methoxyethyl acrylate (42 g), butyl acrylate (42 g), ethyl acrylate (84 g) and allyl methacrylate (3.4 g) as a cross-linking agent which was a polyfunctional vinyl monomer, and t-butyl hydroperoxide (0.16 g) was added to the aqueous latex of the copolymer over 120 minutes, in order to be graft-polymerized. After completion of adding the mixture, stirring was further continued for 2 hours thereby completing the reaction to obtain an aqueous latex containing the minute polymer particle (B1). The polymerization conversion rate was 99%. A portion of the minute polymer particle (B1) (511.4 g) in an aqueous latex state was taken and diluted with water, and then the volume average particle diameter was measured. As a result, it was found that the volume average particle diameter was 0.2 µm and the particle diameter distribution exhibited sharp unimodal dispersion.

Preparation of Composition T1-1 Containing the Minute Polymer Particle (B1)

After mixing an aqueous latex containing the minute polymer particle (B1) (1,000 g) with methyl acetate (1,000 g), water (700 g) was further added thereby reprecipitating the minute polymer particle (B). After separating a liquid phase from the reprecipitate, methyl acetate (1,300 g) was added to the reprecipitate, and the mixture was stirred at room temperature for 90 minutes. After the mixture was mixed with ditrimethylolpropane tetraacrylate (DTMP4A) (1,580 g) as the vinyl monomer (A), methyl acetate was distilled off under reduced pressure to obtain a composition T1-1 (1,859 g) in which 17.7 parts by weight of a graft polymer particle as the minute polymer particle (B1), that is, 15% by weight of the minute polymer particle (B1) was dispersed in 100 parts by weight of ditrimethylolpropane tetraacrylate (DTMP4A).

The composition T1-1 was diluted with methyl ethyl ketone and the volume average particle diameter of the minute polymer particle (B1) was measured again. As a result, it was found that the volume average particle diameter was 0.2 µm and the particle diameter distribution exhibited sharp unimodal dispersion similarly to the minute polymer particle (B1) in an aqueous latex state.

The obtained composition T1-1 (10 g) was taken and diluted with 10 g of methyl ethyl ketone to make 20 g in total of a solution, and then filter evaluation was carried out by passing the solution through a filter having an opening size of 0.45 µm (material of film: RC [regenerated cellulose]). As a result, 20 g of the solution could be entirely filtered.

Furthermore, in the composition T1-1, the dispersion state of the minute polymer particle (B1) did not change even after being left to stand under light shielding in a cool and dark space for 3 months.

Preparation of Composition T1-2 to T1-4 Containing the Minute Polymer Particle (B1)

In the same manner as the above-described preparation of composition T1-1 except the following conditions, compositions T1-2 to T1-4 were obtained:

838 g of ethoxylated (3 mol of ethylene oxide was added) trimethylolpropane triacrylate (EO3TMPTA, using SR-454 manufactured by Sartomer Company, Inc.) was used for the preparation of a composition T1-2;

839 g of hexanediol diacrylate (HDODA) was used for the preparation of a composition T1-3; and 838 g of isobornyl acrylate (IBOA) was used for a preparation of a composition T1-4;

in place of ditrimethylolpropane tetraacrylate (DTMP4A). Any of the compositions T1-2 to T1-4 contained 33.3 parts by mass, that is, 25% by mass, of the minute polymer particle (B1).

Each of the compositions T1-2 to T1-4 was diluted with methyl ethyl ketone and the volume average particle diameter of the minute polymer particle (B1) was measured again. As a result, it was found that the volume average particle diameter was 0.2 µm and particle diameter distribution exhibited sharp unimodal dispersion similarly to the minute polymer particle (B1) in an aqueous latex state.

Each of the obtained compositions T1-2 to T1-4 (10 g) was taken and diluted with 10 g of methyl ethyl ketone to make 20 g in total of a solution, and then filter evaluation was carried out by passing the solution through a filter having an opening size of 0.45 µm (material of film: RC [regenerated cellulose]). As a result, 20 g of the solution could be entirely filtered.

Furthermore, even after the compositions T1-2 to T1-4 were left to stand under light shielding in a cool and dark space for 3 months, the dispersion state of the minute polymer particle (B1) did not change.

Preparation of Composition T-5 Containing the Minute Polymer Particle (B1)

In the same manner as the above-described preparation of composition T1-1 except that 838 g of hydroxyethyl methacrylate (HEMA) was used in place of ditrimethylolpropane tetraacrylate (DTMP4A), composition T1-5 was obtained. The composition T1-5 contained 33.3 parts by mass, that is, 25% by mass, of the minute polymer particle (B1).

The composition T1-5 was diluted with methyl ethyl ketone, and the volume average particle diameter of the minute polymer particle (B1) was measured again. As a result, it was found that the volume average particle diameter was 0.2 µm and particle diameter distribution exhibited sharp unimodal dispersion similarly to the minute polymer particle (B1) in an aqueous latex state.

The obtained composition T1-5 (10 g) was weighed and diluted with 10 g of methyl ethyl ketone to make 20 g in total of a solution, and then filter evaluation was carried out by passing the solution through a filter having an opening size of 0.45 µm (material of film: RC [regenerated cellulose]). As a result, 20 g of the solution could be entirely filtered.

Furthermore, even after the composition T1-5 was left to stand under light shielding in a cool and dark space for 3 months, the dispersion state of the minute polymer particle (B1) did not change.

Preparation of Composition U1-1 Containing the Minute Polymer Particle (B1)

After mixing an aqueous latex containing the minute polymer particle (B1) (1,000 g) with methyl acetate (1,000 g), water (700 g) was further added thereby reprecipitating the minute polymer particle (B). After separating a liquid phase from the reprecipitate, methyl acetate (1,300 g) was added to the reprecipitate, and the mixture was stirred at room temperature for 90 minutes. After the mixture was mixed with 1,580 g of dipentaerythritol hexaacrylate (DPEHA, using A-DPH manufactured by SHIN-NAKAMURA CHEMICAL CO., LTD.) as the vinyl monomer (A), methyl acetate was distilled off under reduced pressure to obtain a composition U1-1 (1,859 g) in which 17.7 parts by mass of the graft polymer particle as the minute polymer particles (B1), that is, 15% by mass of the minute polymer particle (B1) was dispersed in 100 parts by mass of dipentaerythritol hexaacrylate (DPEHA).

The composition U1-1 was diluted with methyl ethyl ketone, and the volume average particle diameter of the minute polymer particle (B1) was measured again. As a result, it was found that the volume average particle diameter was 0.2 µm and the particle diameter distribution exhibited sharp unimodal dispersion similarly to the minute polymer particle (B1) in an aqueous latex state.

The obtained composition U1-1 (10 g) was taken and diluted with 10 g of methyl ethyl ketone to make 20 g in total of a solution, and then filter evaluation was carried out by passing the solution through a filter having an opening size of 0.45 µm and a diameter of 25 mm (material of film: RC [regenerated cellulose]). As a result, 20 g of the solution could be entirely filtered.

Furthermore, even after the composition U1-1 was left to stand under light shielding in a cool and dark space for 3 months, the dispersion state of the minute polymer particle (B1) did not change.

Preparation of Compositions U1-2 to U1-3 Containing the Minute Polymer Particle (B1)

In the same manner as the above-described preparation of composition T1-1 except the following conditions, compositions U1-2 to U1-3 were obtained:

1112 g of pentaerythritol triacrylate (PETA, using A-DPH manufactured by SHIN-NAKAMURA CHEMICAL CO., LTD.) was used for a preparation of a composition U1-2; and 1860 g of Ebecryl5129 (hexafunctional urethane acrylate, manufactured by DAICEL-CYTEC Company LTD., molecular weight: 800) was used for a preparation of a composition U1-3;

in place of dipentaerythritol hexaacrylate (DPEHA).

The composition U1-2 contained 17.7 parts by mass, that is, 15% by mass, of the minute polymer particle (B1), and the composition U1-3 contained 15 parts by mass, that is, 13% by mass, of the minute polymer particle (B1).

Each of the compositions U1-2 to U1-3 was respectively diluted with methyl ethyl ketone, and the volume average particle diameter of the minute polymer particle (B1) was measured again. As a result, it was found that the volume average particle diameter was 0.2 µm and particle diameter distribution exhibited sharp unimodal dispersion similarly to the minute polymer particle (B1) in an aqueous latex state.

Each of the obtained compositions U1-2 to U1-3 (10 g) was taken and diluted with 10 g of methyl ethyl ketone to make 20 g in total of a solution, and then filter evaluation was carried out by passing the solution through a filter having an opening size of 0.45 µm and a diameter of 25 mm (material of film: RC [regenerated cellulose]). As a result, 20 g of the solution could be entirely filtered.

Furthermore, even after the compositions U1-2 to U1-3 were left to stand under light shielding in a cool and dark space for 3 months, the dispersion state of the minute polymer particle (B1) did not change.

Preparation of the Powdered Acrylic Rubber Minute Polymer Particle (B2)

Under a nitrogen atmosphere, water (730 g), sodium dodecylbenzenesulfonate (0.25 g), tripotassium phosphate (0.25 g), iron (II) sulfate hexahydrate (5 mg), EDTA (ethylenediaminetetraacetic acid) (20 mg) and sodium formaldehydesulfoxylate (0.7 g) were added into a 2 L glass reaction vessel. The mixture was heated up to 40° C., and then a mixture of butyl acrylate (BA) (375 g), allyl methacrylate (AlMA) (5.7 g) and cumen hydroperoxide (0.4 g) was added over 240 minutes. Then, the mixture was continuously stirred for 90 minutes. During stirring, sodium dodecylbenzenesulfonate (2 g in total) was dividedly added twice thereto. Thus, an aqueous latex of a rubbery copolymer (380.7 g) as a polymer of a monomer mixture containing butyl acrylate as a main component was obtained.

Next, a mixture containing a monomer mixture (126.3 g) of methyl methacrylate (MMA) (75 g), styrene (St) (50 g) and allyl methacrylate (AlMA) (1.3 g), and t-butyl hydroperoxide (0.2 g) was added to the aqueous latex of the copolymer over 100 minutes, in order to be graft-polymerized. After completion of adding the mixture, the mixture was further continuously stirred for 2 hours thereby completing the reaction to obtain aqueous latex containing the minute polymer particle (B2). The polymerization conversion rate was 99%. A portion of the minute polymer particle (B2) (507 g) in an aqueous latex state was taken and diluted with water, and then the volume average particle diameter was measured. As a result, it was found that the volume average particle diameter was 0.2 µm and particle diameter distribution exhibited sharp unimodal dispersion.

To the minute polymer particle (B2) in an aqueous latex state, an aqueous calcium chloride solution (3% by weight) was added for coagulation. The coagulated particle was dehydrated and then dried at room temperature for 3 days to obtain the powdered minute polymer particle (B2).

Preparation of Composition T2-1 Containing the Minute polymer particle (B2)

To a mixture (490 g in total) of ditrimethylolpropane tetraacrylate (DTMP4A) (460 g) as the vinyl monomer (A) component and the minute polymer particle (B2) (30 g), methyl ethyl ketone (MEK) (125 g) was added. After the powdered minute polymer particle (B2) was blended with a liquid by stirring with a homomixer for about 5 minutes, remaining minute polymer particle (B2) (10 g) was added. The mixture was mixed and dispersed with a homomixer over 1 hour. During such a mixing and dispersing, the mixture was appropriately cooled, since when temperature of a mixture increases, undesired polymerization of the vinyl monomer (A) component may arise. Thus, a MEK dilute solution (625 g) of a composition T2-1 in which the minute polymer particle (B2) was dispersed was obtained.

The composition T2-1 contained 100 parts by mass of DTMP4A as the vinyl monomer (A) component, 8.7 parts by mass of the minute polymer particle (B2) and 27.2 parts by mass of methyl ethyl ketone, and contained the minute polymer particle (B2) in the amount of 8% by mass based on 100% by mass of the total amount of the vinyl monomer (A) component and the minute polymer particle (B2).

The thus obtained composition T2-1 (15 g) was diluted with 8 g of methyl ethyl ketone to make 23 g in total of a mixture, and then the mixture was passed through a filter having an opening size of 0.45 µm and a diameter of 25 mm (material of film: RC [regenerated cellulose]). As a result, clogging occurred, and a half or more of 20 g of the solution could not be filtered. An attempt was made in the same manner except for changing to a filter having the same opening size of 0.45 µm and a diameter of 25 mm (material of film: PTFE [Teflon (registered trademark)]). As a result, the mixture could not be filtered similarly.

Preparation of Composition T2-2 Containing the Minute Polymer Particle (B2)

To a mixture (480 g in total) of ethoxylated (addition of 3 mol of ethylene oxide) trimethylolpropane triacrylate (EO3TMPTA) (440 g) as the vinyl monomer (A) component and the minute polymer particles (B2) (40 g), methyl ethyl ketone (MEK) (125 g) was added. To the mixture, the remaining minute polymer particle (B2) (20 g) was further added. The mixture was mixed for dispersion using a homomixer for 1 hour in total. During mixing and dispersing, the mixture was appropriately cooled, since when the temperature of the mixture increases, undesired polymerization of the vinyl monomer (A) component may arise. Thus, a MEK dilute solution (625 g) of a composition T2-2 in which the minute polymer particle (B2) was dispersed was obtained. The composition T2-2 contained 100 parts by mass of EO3TMPTA as the vinyl monomer (A) component, 13.6 parts by mass of the minute polymer particle (B2) and 28.4 parts by mass of methyl ethyl ketone, and contained the minute polymer particle (B2) in the amount of 12% by mass based on 100% by mass of the total amount of the vinyl monomer (A) component and the minute polymer particle (B2).

The thus obtained composition T2-2 (10 g) was diluted with 10 g of methyl ethyl ketone to make 20 g in total of a mixture, and then a filtration test was carried out in the same manner as in the case of T2-1. As a result, the mixture could not be entirely filtered due to clogging similarly to the case of T2-1.

Preparation of Composition T2-3 Containing the Minute polymer Particle (B2)

In the same preparation manner as in T2-2 except that 1,6-hexanediol diacrylate (HDODA) (441 g) as the vinyl monomer (A) component and methyl ethyl ketone (MEK) (167 g) were used and the minute polymer particle (B2) was added in two portions (40 g and 19 g), the mixing operation was carried out to obtain a MEK dilute solution (667 g) of a composition T2-3. The composition T2-3 contained 100 parts by mass of HDODA as the vinyl monomer (A) component, 13.4 parts by mass of the minute polymer particle (B2) and 37.9 parts by mass of methyl ethyl ketone, and contained the minute polymer particle (B2) in the amount of 11.8% by mass based on 100% by mass of the total amount of the vinyl monomer (A) component and the minute polymer particle (B2).

The thus obtained composition T2-3 (10 g) was diluted with 10 g of methyl ethyl ketone to make 20 g in total of a mixture, and then a filtration test was carried out in the same manner as in the case of T2-1. As a result, the mixture could not be entirely filtered due to clogging similarly to the case of T2-1.

Preparation of Composition U2-1 Containing the Minute Polymer Particle (B2)

To a mixture (588 g in total) of dipentaerythritol hexaacrylate (DPEHA, using A-DPH manufactured by SHIN-NAKAMURA CHEMICAL CO., LTD.) (463 g) as the vinyl monomer (A) component and methyl ethyl ketone (MEK) (125 g), the minute polymer particle (B2) (25 g) was added. After the powdered minute polymer particle (B2) was blended with a liquid by mixing using a homomixer for 5 minutes, the remaining minute polymer particle (B2) (10 g) was further added. The mixture was mixed for dispersion using a homomixer over 1 hour. The mixture was appropriately cooled during mixing and dispersing, since when the temperature of the mixture increases, undesired polymerization of the vinyl monomer (A) component may arise. Thus, a MEK dilute solution (625 g) of a composition U2-1 in which the minute polymer particle (B2) was dispersed was obtained.

The composition U2-1 contained 100 parts by mass of DPEHA as the vinyl monomer (A) component, 7.6 parts by mass of the minute polymer particle (B2) and 27 parts by mass of methyl ethyl ketone, and contained the minute polymer particle (B2) in the amount of 7% by mass based on 100% by mass of the total amount of the vinyl monomer (A) component and the minute polymer particle (B2).

The thus obtained composition U2-1 (15 g) was diluted with 8 g of methyl ethyl ketone to make 23 g in total of a mixture, and then the mixture was passed through a filter having an opening size of 0.45 µm and a diameter of 25 mm (material of film: RC [regenerated cellulose]). As a result, clogging occurred and a half or more of 20 g of the solution could not be filtered. An attempt was made in the same manner except for using a filter having the same opening size of 0.45 µm and a diameter of 25 mm (material of film: PTFE [Teflon (registered trademark)]). As a result, the mixture could not be filtered similarly.

Preparation of Composition U2-2 Containing the Minute Polymer Particle (B2)

To a mixture of Ebecryl 5129 (hexafunctional urethane acrylate, manufactured by DAICEL-CYTEC Company LTD.) (440 g) as the vinyl monomer (A) component and methyl ethyl ketone (MEK) (125 g), the minute polymer particle (B2) (20 g) was added. While the mixture was mixed for dispersion using a homomixer, the remaining minute polymer particle (B2) (13 g) was further added. Then, the mixture was further mixed for dispersion using a homomixer over 1 hour. The mixture was appropriately cooled during mixing and dispersing, since when the temperature of the mixture increases, undesired polymerization of the vinyl monomer (A) component may arise. Thus, a MEK dilute solution (598 g) of a composition U2-2 in which the minute polymer particle (B2) was dispersed was obtained. The composition U2-2 contained 100 parts by mass of urethane acrylate (Ebecryl 5129) as the vinyl monomer (A) component, 7.5 parts by mass of the minute polymer particle (B2) and 28.4 parts by mass of methyl ethyl ketone, and contained the minute polymer particle (B2) in the amount of 7% by mass based on 100% by mass of the total amount of the vinyl monomer (A) component and the minute polymer particle (B2).

The thus obtained composition U2-2 (10 g) was diluted with 10 g of methyl ethyl ketone to make 20 g in total of a mixture, and then a filtration test was carried out in the same manner as in preparation example of U2-1. As a result, the mixture could not be entirely filtered due to clogging similarly to the case of preparation example of U2-1.

Preparation of Composition U2-3 Containing the Minute Polymer Particles (B2)

In the same preparation manner as in U2-2 except that N-vinyl-2-pyrrolidone (NVP) (440 g) as the vinyl monomer (A) component was used and methyl ethyl ketone was not used, and the minute polymer particle (B2) was added in two portions (40 g and 20 g), the mixing operation was carried out to obtain a composition U2-3 (500 g). The composition U2-3 contained 100 parts by mass of NVP as the vinyl monomer (A) component and 13.6 parts by mass of the minute polymer particle (B2), and contained the minute polymer particle (B2) in the amount of 12% by mass based on 100% by mass of the total amount of the vinyl monomer (A) component and the minute polymer particle (B2).

The thus obtained composition U2-3 (10 g) was diluted with 10 g of methyl ethyl ketone to make 20 g in total of a mixture, and then a filtration test was carried out in the same manner as in the case of U2-1. As a result, the mixture could not be entirely filtered due to clogging similarly to the case of U2-1.

Example 1

The T1-1 (34 g), T1-2 (12 g) and T1-3 (48 g) obtained in the above, and DTMP4A (1 g), EO3TMPTA (1 g) and HDODA (4 g) were mixed to obtain 100 g in total of a mixture. The mixture contained the minute polymer particle (B1) (20 g), DTMP4A (30 g), EO3TMPTA (10 g) and HDODA (40 g). The mixture (10 g) was taken and added into a separate vessel. To the vessel, methyl ethyl ketone (2 g), Irgacure 184 (registered trademark) (0.5 g) as a photoradical polymerization initiator and N-methyldiethanolamine (0.2 g) as a photosensitizer were further added. The mixture was mixed to obtain a minute polymer particle-containing photocurable coating composition.

The coating composition was applied on a PC (polycarbonate) sheet having a size of 150 mm×100 mm×0.5 mm in thickness using a bar coater (#20), and then dried at 80° C. for 2 minutes. Using a UV irradiator (ECS-301, manufactured by EYE GRAPHICS CO., LTD.), the coating composition was hardened by a metal halide lamp (120 W/cm) at integrated light quantity of 749 mJ/cm$^2$ to form a coating film having a thickness of 1 mil. The unit "mil" corresponds to 1/1,000 inch =25.4 μm. As a result, a coating film having a visually smooth surface was obtained. The coating film was evaluated by a flex resistance test using a conical mandrel method. The result was 3 inch. The pencil hardness was F.

Example 2

The T1-1 (34 g), T1-2 (12 g), T1-3 (48 g) and T1-5 (4 g) obtained in the above, and DTMP4A (1 g), EO3TMPTA (1 g) and HDODA (4 g) were mixed to obtain 104 g in total of a mixture. The mixture contained the minute polymer particle (B1) (21 g), DTMP4A (30 g), EO3TMPTA (10 g), HDODA (40 g) and HEMA (3 g). The mixture (10 g) was taken and added into a separate vessel. To the vessel, methyl ethyl ketone, Irgacure 184 (registered trademark) as a photoradical polymerization initiator and N-methyldiethanolamine were further added similarly to the Example 1. The mixture was mixed to obtain a minute polymer particle-containing photocurable coating composition.

Using the said coating composition, a coating film was formed in the same manner as in Example 1. As a result, a coating film having a visually smooth surface was obtained. The coating film was evaluated in the same manner as in Example 1. The evaluation result of a flex resistance test using a conical mandrel method was 3 inch, and the pencil hardness was F.

Comparative Example 1

A mixture was obtained by mixing DTMP4A (3 g), EO3TMPTA (1 g) and HDODA (4 g). Then, isodecyl acrylate (IDA) (1.5 g) and cyclohexyl acrylate (CHA) (0.5 g) were added thereto as flexible components in place of the minute polymer particle (B1), to obtain a mixture (10 g in total). The glass-transition temperature of an isodecyl acrylate polymer and a cyclohexyl acrylate polymer are respectively −60° C. and 15° C. A photocurable coating composition was prepared by adding Irgacure 184 and N-methyldiethanolamine in the same manner as the Example 1 except that methyl ethyl ketone (1 g) was added to the mixture.

The coating composition was applied on the same PC sheet used in the Example 1 using a bar coater (#20) and then hardened in the same manner to form a 1 mil thick coating film.

The coating film was evaluated by a flex resistance test using a conical mandrel method. The result was 8 inch. The pencil hardness was HB.

Comparative Example 2

A mixture (8 g in total) was obtained by mixing DTMP4A (3 g), EO3TMPTA (1 g) and HDODA (4 g). A photocurable coating composition was prepared by adding Irgacure 184 (0.4 g) and N-methyldiethanolamine (0.16 g) to be mixed in the same manner as the Example 1 except that methyl ethyl ketone (0.8 g) was added to the mixture.

The coating composition was applied on the same PC sheet used in the Example 1 using a bar coater (#20) and then hardened in the same manner to form a 1 mil thick coating film.

The coating film was evaluated by a flex resistance test using a conical mandrel method. The result was 8 inch. The pencil hardness was F.

From the results of Example 1, Example 2, Comparative Example 1 and Comparative Example 2, photocurable coating compositions of the present invention, which contain a minute polymer particle (B1) as a flexible component (Example 1, Example 2), have high hardness as compared with a composition in which a monomer as a flexible component is separately added (Comparative Example 1). On the other hand, the compositions according to the present invention are also excellent in flex resistance, and are further excellent in flex resistance as compared with nearly the same composition except for containing no minute polymer particle (B1) (Comparative Example 2).

Example 3

The T1-1 (47 g) and T1-3 (53 g) obtained in the above were mixed to obtain a mixture (100 g in total). The mixture contained the minute polymer particle (B1) (20.2 g), DTMP4A (40 g) and HDODA (39.8 g). The mixture (10 g) was weighed and added into a separate vessel. To the vessel, methyl ethyl ketone (2.5 g), Irgacure 184 (registered trademark) (0.5 g) as a photoradical polymerization initiator and N-methyldiethanolamine (0.2 g) were further added. The mixture was mixed to obtain a minute polymer particle-containing photocurable coating composition.

The coating composition was applied on a PC (polycarbonate) sheet having a size of 150 mm×100 mm×0.5 mm in thickness using a bar coater (#20) and then dried at 80° C. for 2 minutes. Then, in the same manner as in the Example 1, the coating composition was then hardened at integrated light quantity of 749 mJ/cm$^2$ to form a 1 mil thick coating film.

The coating film was evaluated by a parallel mandrel method. The results are shown in Table 1. Table 1 shows the results by "(number of samples where cracking occurred in a coating film after test)/(number of tested samples)", in which 0/4 means a good result that no cracking occurred in all coating films, whereas, 4/4 means poor result that cracking occurred in all coating films. The coating film had the pencil hardness of F.

TABLE 1

| | Flex resistance test (parallel mandrel method) (Number of samples where cracking occurred in a coating film)/(number of tested samples) | | | | Pencil hardness |
|---|---|---|---|---|---|
| | φ34 mm | φ25 mm | φ21 mm | φ16 mm | |
| Example 3 | 0/4 | 0/4 | 1/4 | 4/4 | F |
| Comparative Example 3 | 2/4 | 4/4 | 4/4 | — | F |

Comparative Example 3

A mixture (79.8 g in total) was obtained by mixing DTMP4A (40 g) and HDODA (39.8 g). The mixture was added into a separate vessel.

A photocurable coating composition was prepared by adding methyl ethyl ketone (1.5 g), Irgacure 184 (registered trademark) (0.5 g) as a photoradical polymerization initiator and N-methyldiethanolamine (0.2 g) thereto to be mixed.

The coating composition was applied on a PC (polycarbonate) sheet having a size of 150 mm×100 mm×0.5 mm in thickness using a bar coater (#20) and then dried at 80° C. for 2 minutes. In the same manner as in the Example 1, the coating composition was then hardened to form a 1 mil thick coating film.

The coating film was evaluated by a parallel mandrel method. The results are shown in Table 1. The pencil hardness was F.

From the results of Example 3 and Comparative Example 3, a photocurable coating composition of the present invention, which contains a minute polymer particle (B 1) as a flexible component (Example 3) is excellent in flex resistance as compared with nearly the same composition except for containing no minute polymer particle (B1) (Comparative Example 3).

Example 4

The T1-1 (17 g), T1-2 (6 g) and T1-3 (24 g) obtained in the above and DMTP4A (19.2 g), EO3TMPTA (6.8 g) and HDODA (27 g) were mixed to obtain a mixture (100 g in total). The mixture contained the minute polymer particle (B1) (10 g), DTMP4A (33.7 g), EO3TMPTA (11.3 g) and HDODA (45 g). The mixture (10 g) was weighed and added into a separate vessel. To the vessel, methyl ethyl ketone (1.6 g), Irgacure 651 (registered trademark, benzyldimethylketal) (0.5 g) as a photoradical polymerization initiator and N-methyldiethanolamine (0.2 g) were further added. The mixture was mixed to obtain a minute polymer particle-containing photocurable coating composition.

Using the coating composition, a coating film was formed in the same manner as in the Example 1. As a result, a coating film having a visually smooth surface was obtained. With respect to the coating film, a flex resistance property and pencil hardness were evaluated in the same manner as in the Example 1. The evaluation result of the flex resistance test using a conical mandrel method was 5(¾) inch, that is, 5.75 inch, and the pencil hardness was F.

Comparative Example 4

The T2-1 (40 g), T2-2 (16 g) and T2-3 (64.8 g) obtained in the above and DMTP4A (4.2 g) were mixed to obtain a mixture (127.4 g in total). The mixture contained the minute polymer particle (B2) (10.1 g), DTMP4A (33.6 g), EO3TMPTA (11.3 g), HDODA (45 g) and MEK (27.4 g). The mixture (12.7 g) was taken and added into a separate vessel. To the vessel, Irgacure 651 (benzyldimethylketal) (0.5 g) as a photoradical polymerization initiator and N-methyldiethanolamine (0.2 g) were further added. The mixture was mixed to obtain a minute polymer particle-containing photocurable coating composition.

Using the coating composition, a coating film was formed in the same manner as in the Example 1. As a result, a hardened coating film was obtained. However, granular (nubs) was visually observed on the surface. The coating film lacked in smoothness unlike the coating film of the Example 1, and also a striped pattern was slightly observed, and thus the coating film was inferior in appearance. The nubs were also observed in the unhardened coating film. With respect to the coating film after hardening, a flex resistance property and pencil hardness were evaluated in the same manner as in the Example 1. The evaluation result of the flex resistance test using a conical mandrel method was 7(¼) inch, that is, 7.25 inch, and the pencil hardness was HB.

From the results of Example 1, Example 2, Example 4 and Comparative Example 4, coating films having a large content of the minute polymer particle (B1) (Example 1 and Example 2) are excellent in flex resistance as compared with a coating film having a small content of the minute polymer particle (Example 4). It is also found that photocurable coating compositions containing a minute polymer particles-containing vinyl monomer composition in which the minute polymer particle (B1) is primarily dispersed in the vinyl monomer (A) (Examples 1, 2 and 4), that is, coating films in which the minute polymer particle (B1) is primarily dispersed in a composition and is also primarily dispersed in a hardened product is excellent in flex resistance and appearance as compared with a composition in which the minute polymer particle is not primarily dispersed (Comparative Example 4).

Example 5

The T1-1 (17 g), T1-2 (6 g) and T1-3 (24 g) obtained in the above and DMTP4A (18 g), EO3TMPTA (7 g) and HDODA (28 g) were mixed to obtain a mixture (100 g in total). The mixture contained the minute polymer particle (B1) (10 g), DTMP4A (32.5 g), EO3TMPTA (11.5 g) and HDODA (46 g). The mixture (10 g) was taken and added into a separate vessel. To the vessel, Irgacure 651 (registered trademark) (0.5 g) as a photoradical polymerization initiator and N-methyldiethanolamine (0.2 g) as a photosensitizer were further added. The mixture was mixed to obtain a minute polymer particle-containing photocurable coating composition.

The coating composition was applied on a PC (polycarbonate) sheet having a size of 150 mm×100 mm×0.5 mm in thickness using a bar coater (#20) and then dried at 80° C. for 2 minutes. Using a UV irradiator (ECS-301, manufactured by EYE GRAPHICS CO., LTD.), the coating composition was then hardened by a metal halide lamp (120 W/cm) at integrated light quantity of 749 mJ/cm$^2$ to form a coating film having a thickness of 1.2 mil (30.48 μm). As a result, a coating film having a visually smooth surface was obtained. The pencil hardness was F.

Abrasion resistance of the coating film was evaluated in accordance with JIS K7204. The result was 16 mg/1,000 rotations in case of a CS-10 wear ring (under a load of 1,000 g), and 17 mg/1,000 rotations in case of a CS-17 wear ring.

Comparative Example 5

A mixture (9 g in total) was obtained by mixing DTMP4A (3.25 g), EO3TMPTA (1.15 g) and HDODA (4.6 g). A photocurable coating composition was prepared by adding Irgacure 651 (0.45 g) and N-methyldiethanolamine (0.18 g) to be mixed in the same manner as the Example 1.

In the same manner as in the Example 5, the coating composition was hardened to form a 1 mil thick coating film. The pencil hardness was F. Abrasion resistance of the coating film was evaluated in accordance with JIS K7204. The result was 29 mg/1,000 rotations in case of a CS-10 wear ring (under a load of 1,000 g), and 44 mg/1,000 rotations in case of a CS-17 wear ring.

From the results of Example 5 and Comparative Example 5, the photocurable coating composition of the present invention (Example 5) contains a minute polymer particle (B1) as a flexible component, but is excellent in abrasion resistance as compared with the same composition except for containing no minute polymer particle (B1) (Comparative Example 5).

Example 6

The T1-1 (2 g) obtained in the above and EO3TMPTA (2 g) were mixed to obtain a mixture (4 g in total). The mixture contained the minute polymer particle (B1) (0.5 g) and EO3TMPTA (3.5 g). To the mixture, Irgacure 184 (registered trademark) (0.16 g) as a photoradical polymerization initiator was added. The mixture was mixed to obtain a minute polymer particle-containing photocurable coating composition.

The photocurable coating composition was applied on a transparent acrylic (PMMA) plate having a size of 100 mm×70 mm×2 mm in thickness, and then glass plate (1 mm thick) was placed on the coated surface. In other words, the photocurable coating composition was interposed between an acrylic plate and a glass plate. At that time, an attention was paid so that air bubbles were not entrapped between both plates. A small amount of glass beads (300 p, SPL-300 manufactured by UNION CO.) were interposed as a spacer for maintaining a distance between the acrylic plate and the glass plate, together with the photocurable coating composition. A half of the above-mentioned glass plate was black-printed (coated with black color) and the black printed area did not transmit a UV light, and thus the composition located under the black printed area was not irradiated with a UV light.

The photocurable coating composition interposed between the glass plate and the acrylic plate was hardened by irradiating with a UV light from the glass plate side using a metal halide lamp (80 W/cm) (ECS-301, manufactured by EYE GRAPHICS CO., LTD.) at integrated light quantity of 1970 mJ/cm$^2$. After the acrylic plate was peeled from the hardened coating film and the liquid unhardened component was wiped off, the length of the composition which was hardened from the tip portion of the black print (boundary from the dark area to bright area) to the tip toward the dark area direction was measured. As a result, the length was 4.7 mm.

Comparative Example 6

To EO3TMPTA (3.5 g), Irgacure 184 (registered trademark) (0.16 g) as a photoradical polymerization initiator was added. The mixture was mixed to obtain a minute polymer particle-containing photocurable coating composition. The photocurable coating composition was hardened and evaluated in the same manner as the Example 6. As a result, the length of the composition which was hardened from the tip portion of the black print (boundary from the dark area to bright area) to the tip toward the dark area direction was less than 1 mm.

Example 7

The T1-2 (2 g) and T1-4 (2 g) obtained in the above were mixed to obtain a mixture (4 g in total). The mixture contained the minute polymer particle (B1) (1 g), EO3TMPTA (1.5 g) and IBOA (1.5 g). To the mixture, Irgacure 184 (registered trademark) (0.16 g) as a photoradical polymerization initiator was added. The mixture was mixed to obtain a minute polymer particle-containing photocurable coating composition. The photocurable coating composition was hardened and evaluated in the same manner as the Example 6. As a result, the length of the composition which was hardened from the tip portion of the black print (boundary from the dark area to bright area) to the tip toward the dark area direction was 4 mm.

An ultrathin section was made from the obtained hardened product and a TEM (transmission electron microscope) photographsat magnification of 10,000 times was taken and a particle dispersion rate was evaluated by the above-mentioned procedure. As a result of the evaluation, it was confirmed that the particle dispersion rate was higher than 95% and the particle was primarily dispersed.

Comparative Example 7

To a mixture of EO3TMPTA (1.5 g) and IBOA (1.5 g), Irgacure 184 (registered trademark) (0.16 g) as a photoradical polymerization initiator was added. The mixture was mixed to obtain a minute polymer particle-containing photocurable coating composition. The photocurable coating composition was hardened and evaluated in the same manner as the Example 6. As a result, the length of the composition which was hardened from the tip portion of the black print (boundary from the dark area to bright area) to the tip toward the dark area direction was less than 1 mm.

Example 8

The U1-1 (6.7 g) obtained in the above, Ebecryl 5129 (urethane acrylate and having six functional groups, manufactured by DAICEL-CYTEC Company LTD., 3 g) and CD9053 (acrylate modified by an acid having three functional groups, manufactured by Sartomer, 0.3 g) were mixed to obtain a mixture (10 g in total). The mixture contained the minute polymer particle (B1) (1 g), DPEHA (5.7 g), Ebecryl 5129 (3 g) and CD9053 (0.3 g). To the mixture, methyl isobutyl ketone (4 g) and Irgacure 184 (registered trademark) (0.5 g) as a photoradical polymerization initiator were added. The mixture was mixed to obtain a minute polymer particle-containing photocurable coating composition.

The coating composition was applied on an acrylic plate (Acrylite L001 manufactured by Mitsubishi Rayon Co., Ltd.) having a size of 150 mm×100 mm×2 mm in thickness using a bar coater (#4) and then dried at 80° C. for 3 minutes. Using a UV irradiator (ECS-301, manufactured by EYE GRAPHICS CO., LTD.), the coating composition was then hardened by a metal halide lamp (120 W/cm) at integrated light quantity of 1000 mJ/cm$^2$ to form a coating film having a thickness of 0.3 mil (7.62 µm). As a result, a transparent coating film having a visually smooth surface was obtained. The pencil hardness of the coating film was 5H. Further, an ultrathin section was made from the coating film and was observed at magnification of 10,000 times using TEM (transmission electron microscope). As a result, it was confirmed that the minute polymer particle was dispersed independently each other and was primarily dispersed. The particle dispersion rate is higher than 90%.

Example 9

The U1-1 (7.5 g) obtained by the above and NVP (N-vinyl-2-pyrrolidone, 2.5 g) were mixed to obtain a mixture (10 g in total). The mixture contained the minute polymer particle (B1) (1.1 g), DPEHA (6.4 g) and NVP (2.5 g). To the mixture, methyl isobutyl ketone (4 g) and Irgacure 184 (registered trademark) (0.5 g) as a photoradical polymerization initiator were added. The mixture was mixed to obtain a minute polymer particle-containing photocurable coating composition.

The coating composition was applied on an acrylic plate (Acrylite L001 manufactured by Mitsubishi Rayon Co., Ltd.) having a size of 150 mm×100 mm×2 mm in thickness using a bar coater (#4) and then dried at 80° C. for 3 minutes. Using a UV irradiator (ECS-301, manufactured by EYE GRAPHICS CO., LTD.), the coating composition was then hardened by a metal halide lamp (120 W/cm) at integrated light quantity of 1000 mJ/cm$^2$ to form a coating film having a thickness of 0.3 mil (7.62 µm). As a result, a transparent coating film having a visually smooth surface was obtained. The pencil hardness of the coating film was 5H. Further, the coating film was observed with TEM in the same procedure as the Example 8. As a result, it was confirmed that the minute polymer particle was dispersed independently each other and was primarily dispersed. The particle dispersion rate is higher than 90%.

Example 10

The U1-1 (3.8 g) and U1-3 (3.4 g) obtained by the above, CD9053 (acrylate modified by an acid and having three functional groups, manufactured by Sartomer, 0.3 g) and DPEHA (2.5 g) were mixed to obtain a mixture (10 gin total). The mixture contained the minute polymer particle (B1) (1 g), DPEHA (5.7 g), Ebecryl 5129 (3 g) and CD9053 (0.3 g). To the mixture, methyl isobutyl ketone (4 g) and Irgacure 184 (registered trademark) (0.5 g) as a photoradical polymerization initiator were added. The mixture was mixed to obtain a minute polymer particle-containing photocurable coating composition.

The coating composition was applied on an acrylic plate (Acrylite L001 manufactured by Mitsubishi Rayon Co., Ltd.) having a size of 150 mm×100 mm×2 mm in thickness using a bar coater (#4) and then dried at 80° C. for 3 minutes. Using a UV irradiator (ECS-301, manufactured by EYE GRAPHICS CO., LTD.), the coating composition was then hardened by a metal halide lamp (120 W/cm) at integrated light quantity of 1000 mJ/cm$^2$ to form a coating film having a thickness of 0.3 mil (7.62 µm). As a result, a transparent coating film having a visually smooth surface was obtained. The pencil hardness of the coating film was 5H. Further, the coating film was observed with TEM in the same procedure as the Example 8. As a result, it was confirmed that the minute polymer particle was dispersed independently each other and was primarily dispersed. The particle dispersion rate is higher than 90%.

Example 11

The U1-1 (5.9 g) and U1-2 (3.6 g) obtained by the above, and NVP (N-vinyl-2-pyrrolidone, 0.5 g) were mixed to obtain a mixture (10 g in total). The mixture contained the minute polymer particle (B1) (1.6 g), DPEHA (5 g), PETA (2.9 g) and NVP (0.5 g). To the mixture, methyl isobutyl ketone (4 g) and Irgacure 184 (registered trademark) (0.5 g) as a photoradical polymerization initiator were added. The mixture was mixed to obtain a minute polymer particle-containing photocurable coating composition.

The coating composition was applied on an acrylic plate (Acrylite L001 manufactured by Mitsubishi Rayon Co., Ltd.,) having a size of 150 mm×100 mm×2 mm in thickness using a bar coater (#4) and then dried at 80° C. for 3 minutes. Using a UV irradiator (ECS-301, manufactured by EYE GRAPHICS CO., LTD.), the coating composition was then hardened by a metal halide lamp (120 W/cm) at integrated light quantity of 1000 mJ/cm$^2$ to form a coating film having a thickness of 0.3 mil (7.62 µm). As a result, a transparent coating film having a visually smooth surface was obtained. The pencil hardness of the coating film was 4H. Further, the coating film was observed with TEM in the same procedure as the Example 8. As a result, it was confirmed that the minute polymer particle was dispersed independently each other and was primarily dispersed. The particle dispersion rate is higher than 90%.

Example 12

The U1-1 (9.4 g) obtained in the above and CD9053 (acrylate modified by an acid and having three functional groups, manufactured by Sartomer, 0.6 g) were mixed to obtain a mixture (10 g in total). The mixture contained the minute polymer particle (B1) (1.4 g), DPEHA (8 g) and CD9053 (0.6 g). To the mixture, methyl isobutyl ketone (4 g) and Irgacure 184 (registered trademark) (0.5 g) as a photoradical polymerization initiator were added. The mixture was mixed to obtain a minute polymer particle-containing photocurable coating composition.

The coating composition was applied on an acrylic plate (Acrylite L001 manufactured by Mitsubishi Rayon Co., Ltd.,) having a size of 150 mm×100 mm×2 mm in thickness using a bar coater (#4) and then dried at 80° C. for 3 minutes. Using a UV irradiator (ECS-301, manufactured by EYE GRAPHICS CO., LTD.), the coating composition was then hardened by a metal halide lamp (120 W/cm) at integrated light quantity of 1000 mJ/cm$^2$ to form a coating film having a thickness of 0.3 mil (7.62 µm). As a result, a transparent coating film having a visually smooth surface was obtained. The pencil hardness of the coating film was 5H. Further, the coating film was observed with TEM in the same procedure as the Example 8. As a result, it was confirmed that the minute polymer particle was dispersed independently each other and was primarily dispersed. The particle dispersion rate is higher than 90%.

Comparative Example 8

For the comparison with the Example 8, the U2-1 (7.7 g) and U2-2 (4.1 g) obtained in the above and CD9053 (0.3 g) were mixed to obtain a mixture (9.6 g in total). The mixture contained the minute polymer particle (B2) (0.65 g), DPEHA (5.7 g), Ebecryl 5129 (3 g), CD9053 (0.3 g) and MEK (2.4 g). To the mixture, Irgacure 184 (registered trademark) (0.5 g) as a photoradical polymerization initiator and MEK (1.5 g) were added. The mixture was mixed to obtain a minute polymer particle-containing photocurable coating composition.

The coating composition was applied to an acrylic plate in the same method as the Example 8. As a result, the apparent condition was inferior as granular (nubs) was visually observed on the surface and the coating film lacked smoothness compared to the coating film of the Example 8. A lot of nubs were caught by the bar coater and collected in the puddle. By the same method as the Example 8, a hardened coating film could be obtained; however, the apparent condition was not changed and the apparent condition was inferior due to a lot of nubs. When the pencil hardness of the hardened coating film was evaluated, the evaluation was difficult since there was not smooth part on the surface sufficiently due to the nubs. However, the pencil hardness was regarded as 3H, since the difference of scratch on the trajectories of pencils of 4H and 3H. Further, the coating film was observed with TEM in the same procedure as the Example 8. As a result, it was confirmed that there were a few minute polymer particles (B2) which were dispersed independently each other and a lot of the particles were agglutinated. The value of the particle dispersion rate was far inferior to 90% as nubs could be visually observed.

Comparative Example 9

For the comparison with the Example 9, the U2-1 (8.6 g) and U2-3 (2.8 g) obtained by the above were mixed to obtain a mixture (11.4 g in total). The mixture contained the minute polymer particle (B2) (0.8 g), DPEHA (6.4 g), NVP (2.5 g) and MEK (1.7 g). To the mixture, Irgacure 184 (registered trademark) (0.5 g) as a photoradical polymerization initiator and MEK (2.9 g) were added.

The mixture was mixed to obtain a minute polymer particle-containing photocurable coating composition.

The coating composition was applied to an acrylic plate in the same method as the Example 8. As a result, the apparent condition was inferior as granular (nubs) was visually observed on the surface and the coating film lacked smoothness compared to the coating film of the Example 8. A lot of nubs were caught by the bar coater and collected in the puddle. By the same method as the Example 8, a hardened coating film could be obtained; however, the apparent condition was not changed and the apparent condition was inferior due to a lot of nubs. When the pencil hardness of the hardened coating film was evaluated, the evaluation was difficult since there was not smooth part on the surface sufficiently due to the nubs. However, the pencil hardness was regarded as 3H, since the difference of scratch on the trajectories of pencils of 4H and 3H. Further, the coating film was observed with TEM in the same procedure as the Example 8. As a result, it was confirmed that there were a few minute polymer particles (B2) which were dispersed independently each other and a lot of the particles were agglutinated. The value of the particle dispersion rate was far inferior to 90% as nubs could be visually observed.

The invention claimed is:
1. A photocurable coating composition,
comprising 100 parts by mass of a vinyl monomer (A) and not less than 0.1 parts by mass and not more than 50 parts by mass of a minute polymer particle (B);
wherein
the volume average particle diameter of the minute polymer particle (B) is not less than 0.05 μm and not more than 1 μm;
the vinyl monomer (A) contains one or more monomers selected from the group consisting of a (meth)acrylic acid ester monomer, hydroxyethyl (meth)acrylate and a urethane-modified (meth)acrylate as a main component;
the (meth)acrylic acid ester monomer is synthesized from an alcohol having not less than 3 carbon atoms and (meth)acrylic acid;
100 parts by mass of the vinyl monomer (A) consists of
(i) not less than 1 part by mass of the urethane-modified (meth)acrylate, or
(ii) not less than 1 part by mass of the urethane-modified (meth)acrylate, and not more than 90 parts by mass of a vinyl monomer other than the urethane-modified (meth)acrylate;
the minute polymer particle (B) is a core/shell graft copolymer having at least two layers of an elastic core layer present inside and a shell layer present outermost; and
the elastic core layer consists of a rubber polymer having a glass-transition temperature of less than 0° C.,
the minute polymer particle (B) is primarily dispersed in the vinyl monomer (A),
a particle dispersion rate of the minute polymer particle is not less than 90%,
the shell layer consists of a copolymer of 100% by mass of monomers for forming the shell layer; and
the monomers for forming the shell layer consist of
(i) not less than 2% by mass and not more than 90% by mass of one or more monomers (BS-1) selected from the group of consisting of an alkoxyalkyl (meth)acrylate, a hydroxyalkyl (meth)acrylate and glycidyl (meth)acrylate, and
not less than 2% by mass and not more than 98% by mass of one or more monomers (BS-2) selected from the group of consisting of an alkyl (meth)acylate, styrene, α-methylstyrene and (meth)acrylonitrile,
(ii) not less than 2% by mass and not more than 90% by mass of one or more monomers (BS-1) selected from the group of consisting of an alkoxyalkyl (meth)acrylate, a hydroxyalkyl (meth)acrylate and glycidyl (meth)acrylate,
not less than 2% by mass and not more than 98% by mass of one or more monomers (BS-2) selected from the group of consisting of an alkyl (meth)acylate, styrene, a-methylstyrene and (meth)acrylonitrile, and
not more than 10% by mass of a multifunctional vinyl monomer (BS-3),
(iii) not less than 2% by mass and not more than 90% by mass of one or more monomers (BS-1) selected from the group of consisting of an alkoxyalkyl (meth)acrylate, a hydroxyalkyl (meth)acrylate and glycidyl (meth)acrylate,
not less than 2% by mass and not more than 98% by mass of one or more monomers (BS-2) selected from the group of consisting of an alkyl (meth)acylate, styrene, a-methylstyrene and (meth)acrylonitrile, and not more than 10% by mass of other vinyl monomer (BS-4) copolymerizable with the said monomers, or
(iv) not less than 2% by mass and not more than 90% by mass of one or more monomers (BS-1) selected from the group of consisting of an alkoxyalkyl (meth)acrylate, a hydroxyalkyl (meth)acrylate and glycidyl (meth)acrylate,
not less than 2% by mass and not more than 98% by mass of one or more monomers (BS-2) selected from the group of consisting of an alkyl (meth)acylate, styrene, α-methylstyrene and (meth)acrylonitrile,
not more than 10% by mass of a multifunctional vinyl monomer (BS-3), and
not more than 10% by mass of other vinyl monomer (BS-4) copolymerizable with the said monomers.

2. The photocurable coating composition according to claim 1,
wherein, based on 100 parts by mass of vinyl monomer (A), the vinyl monomer other than the urethane-modified (meth)acrylate consists of
(i) not less than 50 parts by mass of the (meth)acrylic acid ester monomer synthesized from the alcohol having not less than 3 carbon atoms and (meth)acrylic acid and/or hydroxyethyl (meth)acrylate, (ii) not less than 50 parts by mass of the (meth)acrylic acid ester monomer synthesized from the alcohol having not less than 3 carbon atoms and (meth)acrylic acid and/or hydroxyethyl (meth)acrylate, and not more than 50 parts by mass of an aromatic vinyl monomer, (iii) not less than 50 parts by mass of the (meth)acrylic acid ester monomer synthesized from the alcohol having not less than 3 carbon atoms and (meth)acrylic acid and/or hydroxyethyl (meth)acrylate, and not more than 50 parts by mass of other vinyl monomer, or (iv) not less than 50 parts by mass of the (meth)acrylic acid ester monomer synthesized from the alcohol having not less than 3 carbon atoms and (meth)acrylic acid and/or hydroxyethyl (meth)acrylate, not more than 50 parts by mass of an aromatic vinyl monomer, and not more than 50 parts by mass of other vinyl monomer.

3. The photocurable coating composition according to claim 2, wherein the other vinyl monomer comprises a (meth)acrylic acid ester monomer synthesized from an alcohol having 1 or 2 carbon atoms and (meth) acrylic acid, a vinylcyan monomer, a (meth)acrylamide monomer, a N-vinylamide monomer, and an allyl ester monomer.

4. The photocurable coating composition according to claim 1, wherein the vinyl monomer other than the urethane-modified (meth)acrylate is one or more monomers selected from the group consisting of the (meth)acrylic acid ester monomer synthesized from the alcohol having not less than 3 carbon atoms and (meth)acrylic acid, hydroxyethyl (meth)acrylate and an aromatic vinyl monomer.

5. The photocurable coating composition according to claim 1, wherein the (meth)acrylic acid ester monomer synthesized from the alcohol having not less than 3 carbon atoms and (meth)acrylic acid is a cycloaliphatic alkyl (meth)acrylate, an alkyleneglycol di(meth)acrylate, a tri(meth)acrylate having a branched alkylene ether group or a poly(meth)acrylate having multiple branched alkyl groups.

6. The photocurable coating composition according to claim 1, wherein the urethane-modified (meth)acrylate has not less than 3 (meth)acryloyloxy groups in the molecule.

7. A coating film, obtained by hardening the photocurable coating composition according to claim 1.

8. The coating film according to claim 7, wherein the thickness of the coating film is not less than one-and-a-half of the volume average particle diameter of the minute polymer particle (B) and not more than 100 μm.

* * * * *